US006992993B1

(12) United States Patent
Park et al.

(10) Patent No.: US 6,992,993 B1
(45) Date of Patent: Jan. 31, 2006

(54) METHOD FOR CELL SELECTION OF ASYNCHRONOUS MOBILE STATION IN ASYNCHRONOUS MOBILE COMMUNICATION SYSTEM

(75) Inventors: Jae-Hong Park, Ichon-shi (KR); Woon-Hee Hwang, Espoo (FI); Chong-Won Lee, Ichon-shi (KR); Jeong-Hwa Ye, Ichon-shi (KR)

(73) Assignee: UTStarcom, Inc., Alameda, CA (US)

( * ) Notice: Subject to any disclaimer, the term of this patent is extended or adjusted under 35 U.S.C. 154(b) by 641 days.

(21) Appl. No.: 09/722,770

(22) Filed: Nov. 27, 2000
(Under 37 CFR 1.47)

(30) Foreign Application Priority Data

Nov. 26, 1999 (KR) ............................... 1999-53179

(51) Int. Cl.
*H04Q 7/00* (2006.01)
(52) U.S. Cl. ...................... 370/328; 370/352; 370/401; 455/432.1; 455/435.1
(58) Field of Classification Search ............... 455/434, 455/435.1, 435.2, 435.3; 370/353, 356, 314, 370/338, 331, 349, 352, 328, 329, 401
See application file for complete search history.

(56) References Cited

U.S. PATENT DOCUMENTS

| 5,586,338 | A |   | 12/1996 | Lynch et al. | ............... | 455/34.1  |
|-----------|---|---|---------|--------------|----------------|-----------|
| 5,675,628 | A | * | 10/1997 | Hokkanen     | ...................| 455/433   |
| 5,734,980 | A |   | 3/1998  | Hooper et al.| ...............| 455/434   |
| 5,862,481 | A | * | 1/1999  | Kulkarni et al.| .........  | 455/432.2 |
| 6,085,085 | A | * | 7/2000  | Blakeney, II et al. | .... | 455/426.1 |
| 6,094,581 | A |   | 7/2000  | Fried et al. | .................| 455/449   |
| 6,128,489 | A | * | 10/2000 | Seazholtz et al. | ........ | 455/432.1 |
| 6,334,052 | B1| * | 12/2001 | Nordstrand   | ..................| 455/411   |
| 6,389,008 | B1| * | 5/2002  | Lupien et al.| ...............| 370/352   |
| 6,463,055 | B1| * | 10/2002 | Lupien et al.| ...............| 370/353   |
| 6,542,741 | B2| * | 4/2003  | Wallstedt et al. | ........... | 455/434 |
| 6,594,482 | B1| * | 7/2003  | Findikli et al. | .............| 455/411  |
| 6,606,491 | B1| * | 8/2003  | Peck         | ..........................| 455/411 |
| 6,615,037 | B1| * | 9/2003  | Bharatia et al. | ............| 455/417  |
| 2002/0197992 | A1 | * | 12/2002 | Nizri et al. | .................| 455/435 |
| 2004/0162068 | A1 | * | 8/2004  | Lamb et al.  | .............| 455/432.1 |

FOREIGN PATENT DOCUMENTS

WO          9736443         10/1997

* cited by examiner

*Primary Examiner*—Seema S. Rao
*Assistant Examiner*—Michael J. Moore
(74) *Attorney, Agent, or Firm*—McDonnell Boehnen Hulbert & Berghoff LLP

(57) ABSTRACT

A method for cell selection of an asynchronous mobile station in an asynchronous mobile communication system including an asynchronous mobile station, an asynchronous radio network, in case the asynchronous mobile communication system is interlocked with a core network, includes the steps of: storing information related to the core network transmitted from the asynchronous radio network in a memory or a user subscriber identity module (USIM) of the asynchronous mobile station before power-off of the asynchronous mobile station of the asynchronous mobile station; at power-on of the asynchronous mobile station, determining what type of the core network is interlocked by analyzing the information of the core network; beginning any one of a global system for mobile communication (GSM) cell procedure and an American national standards institute (ANSI) cell procedure; finding a cell suitable for providing a service, based on a type of the core network that was determined; and performing a location registration of the found cell.

53 Claims, 15 Drawing Sheets

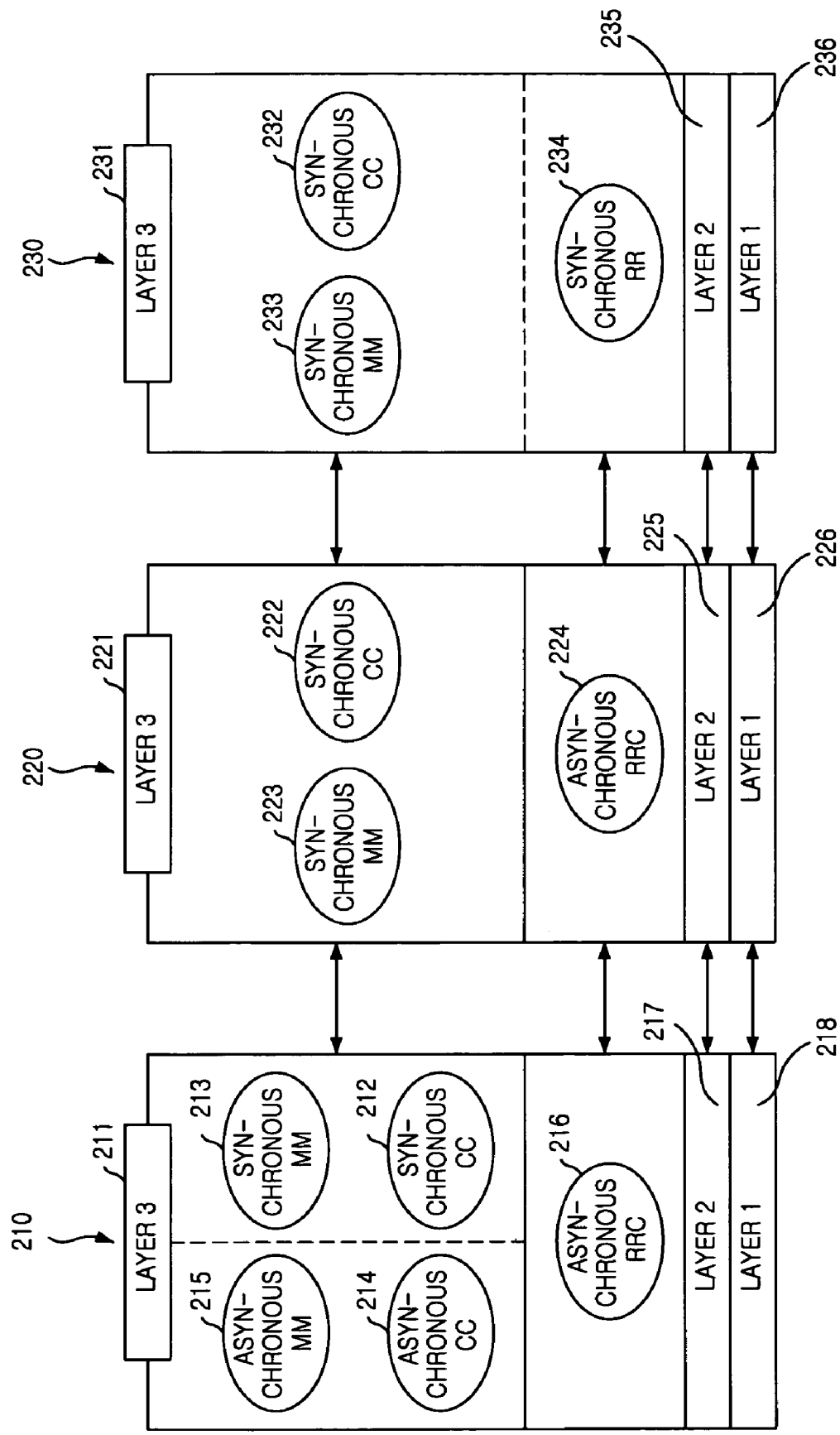

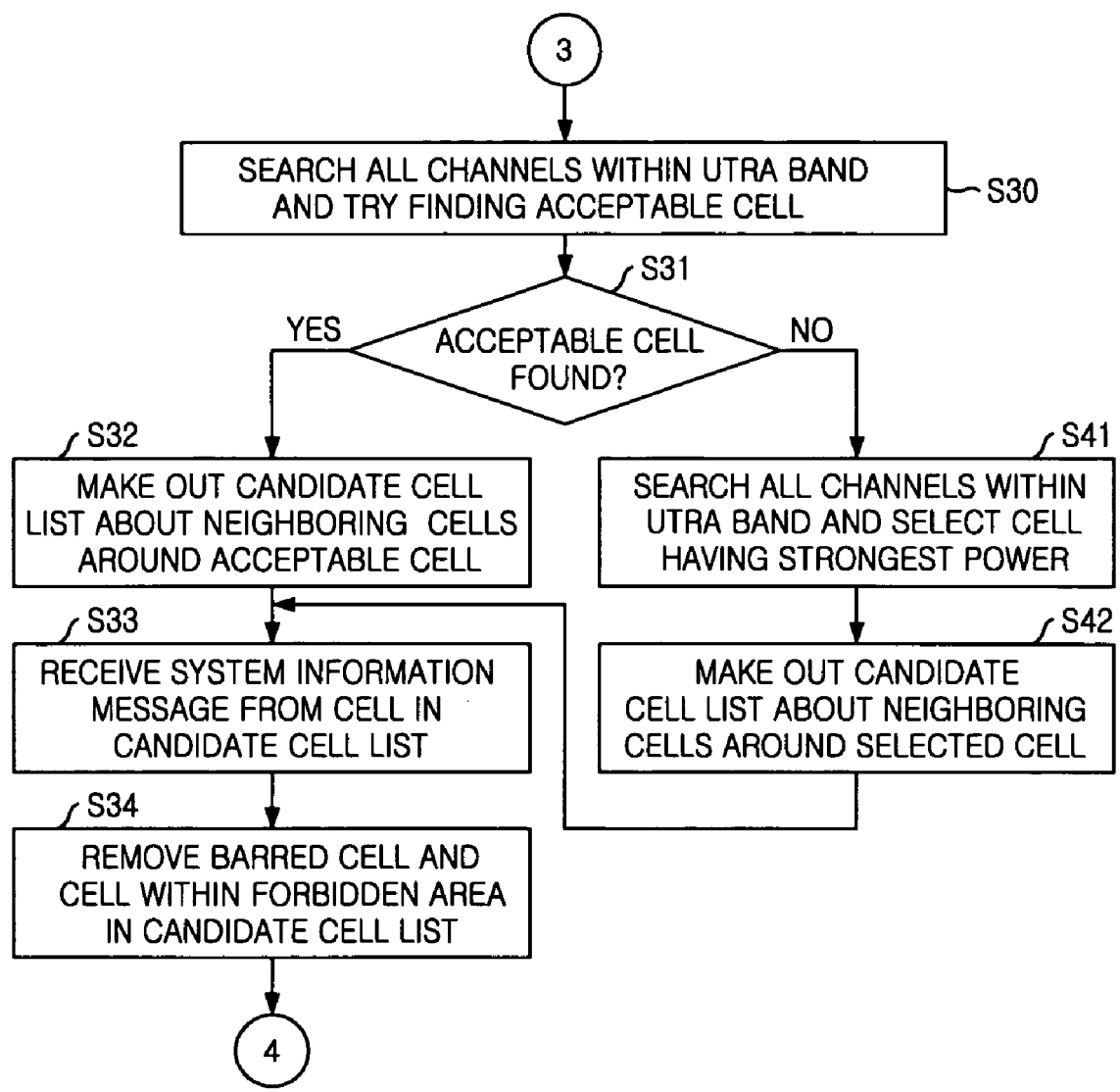

FIG. 5F

S49: MAKE OUT CANDIDATE CELL LIST ABOUT NEIGHBORING CELLS AROUND FOUND SUITABLE CELL WHICH HAVE INFORMATION OF CORE NETWORK DISCRIMINATOR AND INFORMATION OF NID, SID, MIN_P_REV AND P_REV EQUAL TO SELECTED INFORMATION OF CORE NETWORK AND SELECTED INFORMATION OF NID, SID, MIN_P_REV AND P_REV, AND ALSO SELECTED MIN_P_REV ≤ MOB_P_REV OF MOBILE STATION

S50: RECEIVE SYSTEM INFORMATION MESSAGE FROM CELL IN CANDIDATE CELL LIST

S51: REMOVE BARRED CELL AND CELL WITHIN FORBIDDEN AREA IN CANDIDATE CELL LIST

S52: CALCULATE CELL SELECTION VALUE OF CELLS IN NEW CANDIDATE CELL LIST

S53: SELECT AND STORE CELLS, IN ORDER OF HIGH VALUE, WHICH HAVE CELL SELECTION VALUE HIGHER THAN "0"

S54: SELECT CELL WHICH HAS MAXIMUM CELL SELECTION VALUE

S55: PERFORM LOCATION REGISTRATION

S56: LOCATION REGISTRATION PERFORMED SUCCESSFULLY? — NO → (9)

YES ↓

S57: STORE INFORMATION OF CORE NETWORK DISCRIMINATOR AND INFORMATION OF SID, NID, MIN_P_REV, P_REV AND THEN PERFORM NORMAL SERVICE AND OPERATION

END

METHOD FOR CELL SELECTION OF ASYNCHRONOUS MOBILE STATION IN ASYNCHRONOUS MOBILE COMMUNICATION SYSTEM

FIELD OF THE INVENTION

This invention relates to a method for cell selection of an asynchronous mobile station in an asynchronous mobile communication system; and, more particularly, to a method for cell selection of an asynchronous mobile station in an asynchronous mobile communication system, wherein an asynchronous radio network is interlocked with any one of a GSM-MAP core network and an ANSI-41 core network.

DESCRIPTION OF THE PRIOR ART

In a conventional asynchronous mobile communication system, an asynchronous mobile station is connected to an asynchronous radio (for example, a universal mobile telecommunication system (UMTS) terrestrial radio access (UTRAN)), and a global system for mobile communications-mobile application part (GSM-MAP) network is connected to a core network.

FIG. 1 is a view showing the core network interface architecture of the conventional asynchronous mobile communication system. In this drawing, the reference numeral 21 denotes an asynchronous mobile station, 22 denotes an asynchronous radio network (i.e., a UTRAN) which includes a Node B, which is similar with the base transceiver station (BTS) in synchronous mobile communication system, and a radio network controller (RNC), and 23 denotes an asynchronous core network which includes an asynchronous mobile services switching center (MSC) 24 connected to the UTRAN 22.

In the above core network interface architecture of the conventional asynchronous mobile communication system, the asynchronous mobile station 21 is connected to the asynchronous radio network 22 (i.e., UTRAN) which is in turn connected to the asynchronous core network 23, thereby allowing the asynchronous mobile station 21 to perform a data interfacing operation with the asynchronous core network 23.

FIG. 2 is a view showing the layered protocol structure of the conventional asynchronous mobile communication system. In this drawing, the reference numeral 60 denotes an asynchronous mobile station, 70 a UTRAN and 80 an asynchronous core network.

The asynchronous mobile station 60 comprises a layer 3 61, a layer 2 65 and a layer 1 66. In particular, the layer 3 61 includes a non-access stratum (NAS) part and an access stratum (AS) part. The NAS part includes an asynchronous call control (CC) part 62 for management of a call and an asynchronous mobility management (MM) part 63 for management of a mobility. The AS part includes an asynchronous radio resource control (RRC) part 64 for radio resource control. In the asynchronous system, the asynchronous RRC sub layer is apparently separated from the NAS part. Functions of the asynchronous RRC sub layer are the same as those of the synchronous RR sub layer.

The UTRAN 70 comprises a layer 3 71, a layer 2 73 and a layer 1 74. The layer 3 71 of the UTRAN 70 has no NAS part having asynchronous CC part and asynchronous MM part. The layers 3 to 1 of the UTRAN 70 are connected and correspond respectively to those in the asynchronous mobile station 60 and those in the asynchronous core network 80. However, since the UTRAN 70 does not have the NAS part, i.e., the asynchronous CC part and the asynchronous MM part, the NAS parts of the asynchronous mobile station 60 and the asynchronous core network 80 are coupled to each other not through the UTRAN 70.

The asynchronous core network 80 comprises a layer 3 having a NAS part 81 connected to that of the asynchronous mobile station 60 and a AS part, a layer 2 85 and a layer 1 86 connected respectively to those in the UTRAN 70. The NAS part comprises an asynchronous CC part 82 for management of a call and an asynchronous MM part 83 for management of a mobility.

In the above interlocking structure, the asynchronous mobile station 60 receives a system information message from the UTRAN 70 over a broadcast control channel (BCCH) and acquires information necessary to its connection to the asynchronous core network 80 and the UTRAN 70, including information related to the asynchronous core network 80 and information about the UTRAN 70, from the received system information message.

IMT-2000 systems are the third generation systems which aim to unify the various mobile telecommunication networks and services into one to provide many mobile telecommunication services. The systems can provide multimedia services under multi-environments through various air-interfaces and high capacity. Also, in the aspect of services, the systems can provide multimedia services of speech, image and data up to the rate of 2 Mbps and an international roaming. And, in the aspect of network, the systems are total systems, which are based on ATM networks and combine fixed and wireless systems.

IMT-2000 system requires new system concept, high-level adaptation technology, and novel network technology, as well all conventional technologies, which were already adopted in the second digital cellular system.

As described above, in the next-generation mobile telecommunication system such as the IMT-2000 system, either the GSM-MAP network used in the above conventional asynchronous mobile communication system or the ANSI-41 network used in the above conventional synchronous mobile communication system should be employed as a core network in order to perform an international roaming in a synchronous or asynchronous mobile communication system of an IMT-2000 system.

According to network deployment scenarios, the asynchronous IMT-2000 system can have the following two interface architectures; first: asynchronous mobile station—asynchronous radio network—synchronous ANSI-41 network and second: asynchronous mobile station—asynchronous radio network—asynchronous GSM-MAP network.

FIG. 3 shows core network interface architectures of the next-generation mobile communication system such as the IMT-2000 system.

FIG. 3A is a view showing an asynchronous GSM-MAP core network interface architecture of a hybrid type asynchronous radio network. In this drawing, the reference numeral 210 denotes a hybrid type asynchronous mobile station, 220 denotes a hybrid type UTRAN which is a hybrid type asynchronous radio network, and 230 denotes a core network which is connected to the hybrid type UTRAN 220 and includes an asynchronous mobile service switching center (MSC).

FIG. 3B is a view showing a synchronous ANSI-41 core network interface architecture of the hybrid type asynchronous radio network. In this drawing, the reference numeral 210 denotes a hybrid type asynchronous mobile station, 220 denotes a hybrid type UTRAN which is a hybrid type asynchronous radio network, and 240 denotes a core network which is connected to the hybrid type UTRAN 220 and includes a synchronous MSC.

In order to be operable adaptively to the above two interface architectures, the hybrid type asynchronous mobile stations in the next-generation mobile communication system has both asynchronous CC and MM protocol entities serving for the GSM-MAP core network and synchronous CC and MM protocol entities serving for the ANSI-41 core network, at the layer 3 in the protocol stack structure, which is different from the asynchronous mobile stations used in the conventional asynchronous mobile communication system.

FIG. 4 shows layered protocol structures of the next-generation mobile communication system.

FIG. 4A is a view showing layered protocol structures of a hybrid type asynchronous mobile station, a hybrid type asynchronous radio network and a synchronous ANSI-41 core network. In this drawing, the reference numeral 210 denotes a hybrid type asynchronous mobile station, 220 denotes a hybrid type UTRAN which is a hybrid type asynchronous radio network, and 230 denotes an ANSI-41 core network connected to the hybrid type UTRAN 220.

The hybrid type asynchronous mobile station 210 comprises a layer 3 211, a layer 2 217 and a layer 1 218. The layer 3 211 includes a synchronous CC part 212, a synchronous MM part 213, an asynchronous CC part 214, an asynchronous MM part 215 and asynchronous RRC part 216 and selectively activates a synchronous CC/MM protocol or an asynchronous CC/MM protocol.

For example, if the hybrid type asynchronous mobile station 210 is currently connected to the ANSI-41 core network 230, the layer 3 therein activates a protocol between the synchronous CC part 212 and synchronous MM part 213 to perform a message interfacing operation with the ANSI-41 core network 230.

The ANSI-41 core network 230 comprises a layer 3 231, a layer 2 235 and a layer 1 236. The layer 3 231 includes a synchronous CC part 232, a synchronous MM part 233 and a synchronous RR part 234.

FIG. 4B is a view showing layered protocol structures of a hybrid type asynchronous mobile station, a hybrid type asynchronous radio network and an asynchronous GSM-MAP core network. In this drawing, the reference numeral 210 denotes a hybrid type asynchronous mobile station, 220 denotes a hybrid type UTRAN which is a hybrid type asynchronous radio network, and 240 denotes an asynchronous GSM-MAP core network connected to the hybrid type UTRAN 220.

The hybrid type asynchronous mobile station 210 comprises a layer 3 211 having a NAS part and an AS part, a layer 2 217 and a layer 1 218. The NAS part includes a synchronous CC part 212, a synchronous MM part 213, an asynchronous CC part 214 and an asynchronous MM part 215 and selectively activates a synchronous CC/MM protocol or an asynchronous CC/MM protocol. For example, if the hybrid type asynchronous mobile station 210 is currently connected to the GSM-MAP core network 240, the NAS part therein activates protocols of the asynchronous CC part 214 and asynchronous MM part 215 to perform a message interfacing operation with the GSM-MAP core network 240. The AS part includes an asynchronous RRC part 216.

The hybrid type asynchronous radio network 220 comprises a layer 3 221 having a NAS part and an AS part, a layer 2 225 and a layer 1 226, which activate their protocols corresponding respectively to those in the hybrid type synchronous mobile station 210 and those in the GSM-MAP core network 240 to transmit and receive messages. The layer 3 221 includes a synchronous CC part 222, a synchronous MM part 223 and asynchronous RRC part 224 and selectively activates a synchronous CC/MM protocol.

For example, if the hybrid type asynchronous radio network 220 is currently connected to the GSM-MAP core network 240, the layer 3 221 therein does not activate protocols of the synchronous CC part 222 and synchronous MM part 223.

The other way, if the hybrid type asynchronous radio network 220 is currently connected to the ANSI-41 core network 230, the layer 3 221 therein activates protocols of the synchronous CC part 222 and synchronous MM part 223.

The GSM-MAP core network 240 comprises a layer 3 241 having a NAS part and an AS part, a layer 2 245 and a layer 1 246. The NAS part includes an asynchronous CC part 242 and an asynchronous MM part 243. The AS part includes an asynchronous RRC part 244.

In an interlocking structure shown in FIG. 3A, after power-on, an asynchronous mobile station is operated to select a cell which the asynchronous mobile station will be interlocked with and a public land mobile network (PLMN), based on PLMN identity (ID) information and cell information stored in a memory or a user subscriber identity module (USIM) of the asynchronous mobile station. A PLMN selection means that a PLMN ID is selected by the asynchronous mobile station. A cell selection means that a cell covered by the selected PLMN is selected by the asynchronous mobile station.

That is, at power-on, after performing a PLMN selection procedure, the asynchronous mobile station performs a cell selection. The PLMN selection doesn't mean that the asynchronous mobile station selects a fixed PLMN ID, but that the asynchronous mobile station selects a potential PLMN ID, temporarily. Until a cell selection is completed through a cell selection procedure and thereafter, a location registration is completed, a process of the PLMN selection and the cell selection is not performed completely at the mobile station.

The above PLMN ID refers to an ID used for discriminating a plurality of PLMNs and includes a mobile country code (MCC). The plurality of the PLMNs are discriminated one another, based on a country identity, an entrepreneur identity, and a service that an entrepreneur can provide to the asynchronous mobile station, or the like. The PLMN identity is used only in the GSM-MAP network and is identified only in the asynchronous CC and MM protocol entities of the GSM-MAP core network. Also, the PLMN is classified into a home public land mobile network (HPLMN) and a visited public land mobile network (VPLMN).

An MCC and an MNC that the HPLMN includes are same as an MCC and an MNC that an international mobile subscriber identity (IMSI) of the asynchronous mobile station includes. As for an MCC and an MNC that the VPLMN includes, the MCC is same as the MCC of the IMSI, however, the MNC is not same as the MNC of the IMSI.

A cell refers to a geographical area which a base station covers for communicating with a mobile station. Through the cell, the asynchronous mobile station can find out a current location of itself and also, the asynchronous mobile communication system can find out the current location of the asynchronous mobile station connected to the system itself.

To perform the cell selection, the cell can be classified into a suitable cell, an acceptable cell, a barred cell, and an operating only cell.

The suitable cell refers to a cell wherein the mobile station can performs a normal service and the asynchronous mobile station selects this cell through the cell selection. The suitable cell has a priority and should satisfy following requirements that the cell should pertain to a selected PLMN Identity; a path loss between the asynchronous mobile station and the UTRAN should be under a threshold that an operator sets up; the cell should not be the barred cell or the operating only cell, or should not be in an area of the barred cell or operator only cell; and the cell should not be in a region wherein a service such as a roaming is impossible.

The acceptable cell refers to a cell wherein the mobile station can't perform the normal service but an emergency call. The acceptable cell should satisfy following requirements that the cell may or may not pertain to the selected PLMN Identity; a path loss between the asynchronous mobile station and the UTRAN should be under a threshold that an operator sets up; the cell should not be the barred cell or the operating only cell, or should not be in an area of the barred cell or the operating only cell; and the cell should not be in an area wherein the service such as the roaming is impossible.

The barred cell refers to a cell that the mobile station can't select. This cell is selected in case there are not provided the suitable cell and the acceptable cell and performs only the emergency call.

The operating only cell refers to a cell that is selected and used for a test and so on by the operator. The mobile station cannot select this cell.

For example, in an interlocking structure shown in FIG. 3A, an operation of the PLMN selection and the cell selection will be described below.

At power-on, the asynchronous mobile station selects the PLMN ID from a PLMN list stored in the memory or the USIM of the asynchronous mobile station according to a rule of a PLMN used previously; a HPLMN; and a PLMN having a priority stored in the USIM.

After selecting the PLMN ID according to the above rule, the asynchronous mobile station finds the suitable cell based on information of the cell selection stored prior to power-off or by searching a RF (radio frequency) channel in an UTRA band. A candidate cell list for a plurality of cells around the found suitable cell is made out. And, the asynchronous mobile station receives a system information message from each cell in the candidate cell list and stores, by each cell, information of the PLMN ID; a registration area ID; a cell priority; a minimum received level; a maximum UE (user equipment) transmit power; a cell type; and a neighboring cell.

Based on this information, the asynchronous mobile station removes a barred cell, an operating only cell, cells within a forbidden registration area, and cells within area wherein the service such as the roaming is impossible, and makes out a new candidate cell list. After then, the asynchronous mobile station calculates a cell selection value of each cell listed in the new candidate cell list. A mathematical equation (1) for calculating the cell selection value is represented below.

$$S = Q - Q_m - P_c$$

In the mathematical equation (1), S, Q, $Q_m$, and $P_c$ denotes a cell selection parameter having a unit of dB, a quality value of a received signal having a unit of dB, a quality value minimally required in the cell having a unit of dB, and a compensation value having a unit of dB, respectively.

Cells that have the cell selection value higher than "0" are selected from the cell list. In case a plurality of cells is selected, a corresponding priority is given to each cell based on the calculated cell selection value. The asynchronous mobile station selects a cell that has the cell selection value of which is high than "0" and the maximum. And, the asynchronous mobile station tries the location registration of the selected cell to the UTRAN. If the location registration is completed successfully, the asynchronous mobile station selects a temporarily selected PLMN ID.

Also, in an interlocking structure shown in FIG. 3B, the asynchronous mobile station performs the PLMN selection and the cell selection. The synchronous CC and MM protocol entities of the ANSI-41 core network are operated and also, the synchronous CC and MM protocol entities of the asynchronous mobile station are operated.

In case of the ANSI-41 core network, the network identity (NID) and the system identity (SID) are used in order to discriminate a plurality of PLMNs. Thus, in the interlocking structure shown in FIG. 3B, the NID and the SID are used instead of the PLMN ID in order to discriminate the plurality of the PLMNs because there are not the PLMN ID in case of the ANSI-41 core network.

The current asynchronous mobile station stores the PLMN ID used in the GSM-MAP core network prior to power-off and makes out and manages the PLMN list, but has a structure incapable of handling information with respect to the NID and SID used in the ANSI-41 core network. Consequently, in case the ANSI-41 core network is interlocked with the asynchronous mobile communication system as shown in FIG. 3B, the asynchronous mobile station, at power-on, has no information of combining the SID and NID used in the ANSI-41 core network. And the rule of the suitable cell is not applied to the cell of the asynchronous mobile communication system interlocked with the ANSI-41 core network.

Thus, there is a problem that the asynchronous mobile station cannot select a better cell, even though the cell of the asynchronous mobile communication system interlocked with the ANSI-41 core network is better than that of the asynchronous mobile communication system interlocked with the GSM-MAP core network.

SUMMARY OF THE INVENTION

It is an object of the present invention to provide a method for cell selection of an asynchronous mobile station in an asynchronous mobile communication system, when an asynchronous radio network of the asynchronous mobile communication system is interlocked with an asynchronous GSM-MAP core network or a synchronous ANSI-41 core network.

In accordance with an aspect of the present invention, there is provided a method for cell selection of an asynchronous mobile station in an asynchronous mobile communication system including the asynchronous mobile station and an asynchronous radio network, in case the asynchronous mobile communication system is interlocked with a core network, the method comprising the steps of: a) storing information related to the core network transmitted from the asynchronous radio network in a memory or a user subscriber identity module (USIM) of the asynchronous mobile station; b) at power-on of the asynchronous mobile station, determining what type of the core network is interlocked by analyzing the information of the core network; c) beginning any one of a global system for mobile communication (GSM) cell procedure and an American national standards institute (ANSI) cell procedure; d) finding a cell suitable for providing a service, based on a type of the core network that was determined; and e) performing a location registration of the found cell.

BRIEF DESCRIPTION OF THE DRAWINGS

Other objects and aspects of the invention will become apparent from the following description of the embodiments with reference to the accompanying Drawings, in which:

FIG. 3 shows core network interface architectures of the next-generation mobile communication system, wherein:

FIG. 4 shows layered protocol structures of the next-generation mobile communication system, wherein:

FIG. 4A is a view showing layered protocol structures of hybrid type asynchronous mobile station and radio network and the synchronous ANSI-41 core network.

FIGS. 5A to 5J are flow charts illustrating a method for cell selection of an asynchronous mobile station in an asynchronous mobile communication system in accordance with the present invention.

DETAILED DESCRIPTION OF THE PREFERRED EMBODIMENTS

Figure 1:
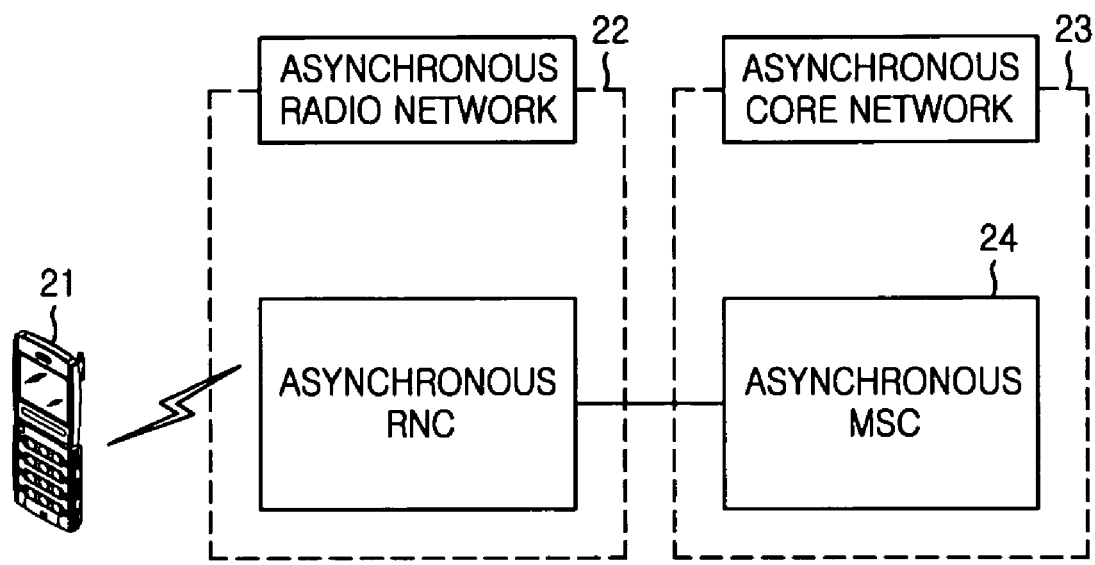
FIG. 1 is a view showing a core network interface architecture of the conventional asynchronous mobile communication system.
Figure 2:
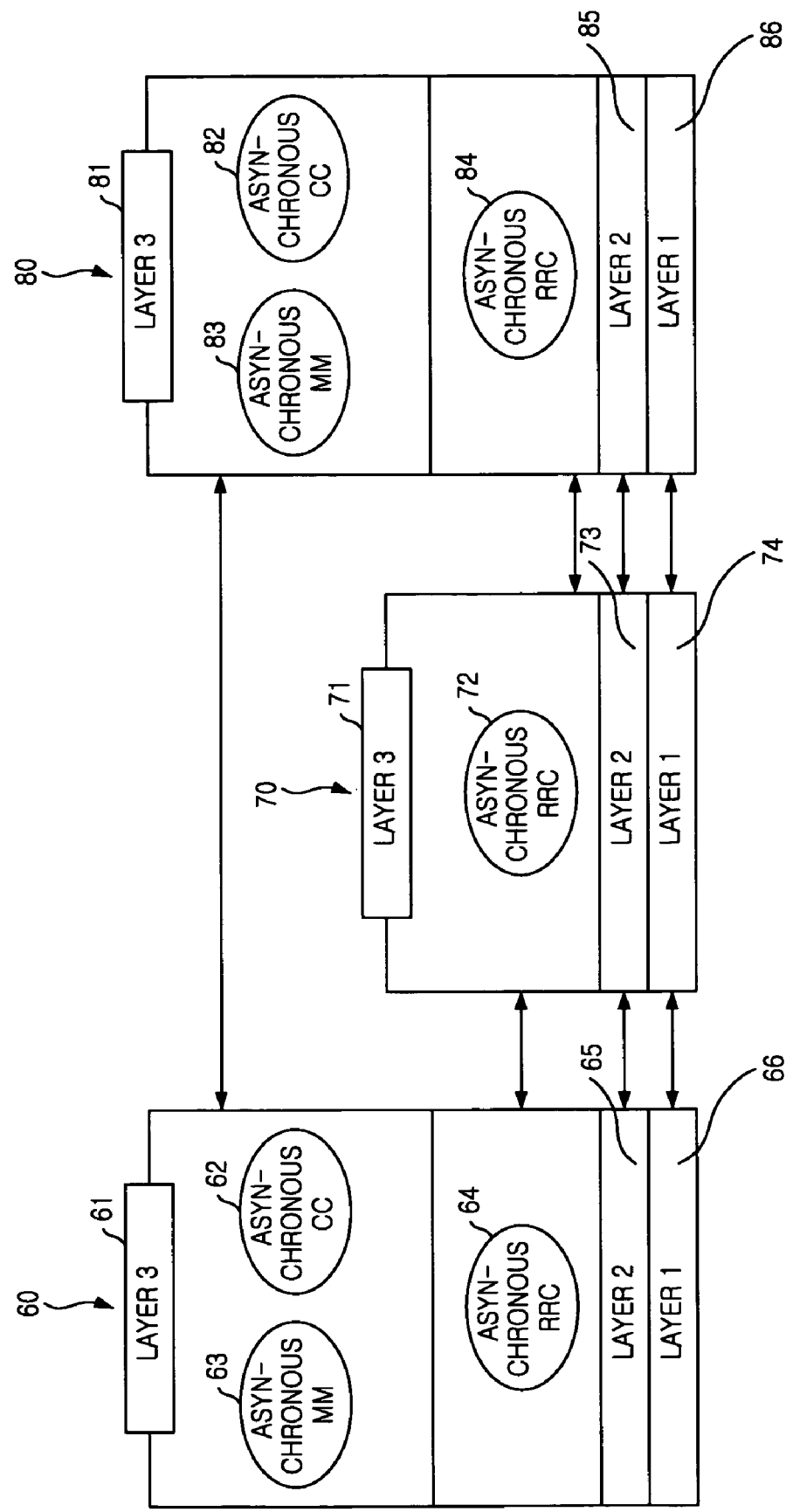
FIG. 2 is a view showing a layered protocol structure of the conventional asynchronous mobile communication system.
Figure 3A:
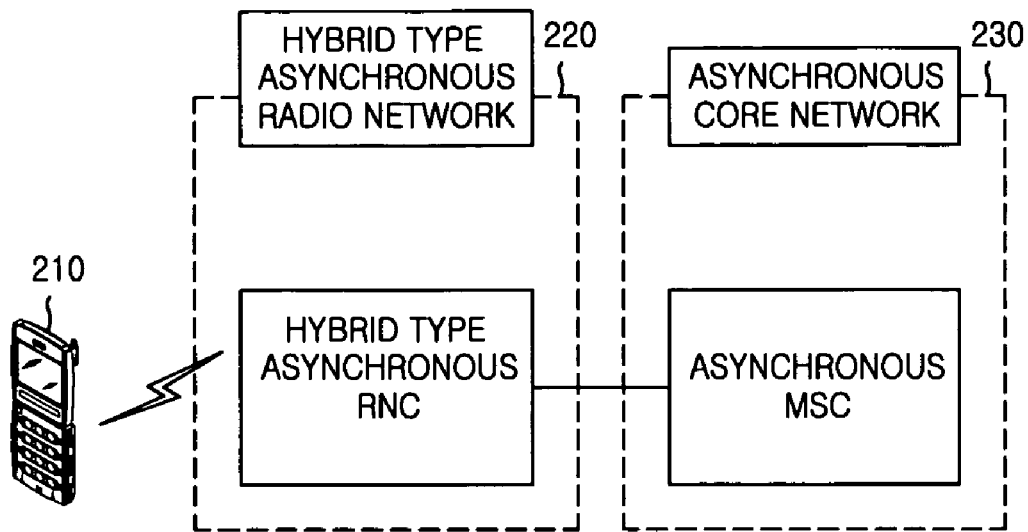
FIG. 3A is a view showing an asynchronous GSM-MAP core network interface architecture of hybrid type asynchronous mobile station and radio network.
Figure 3B:
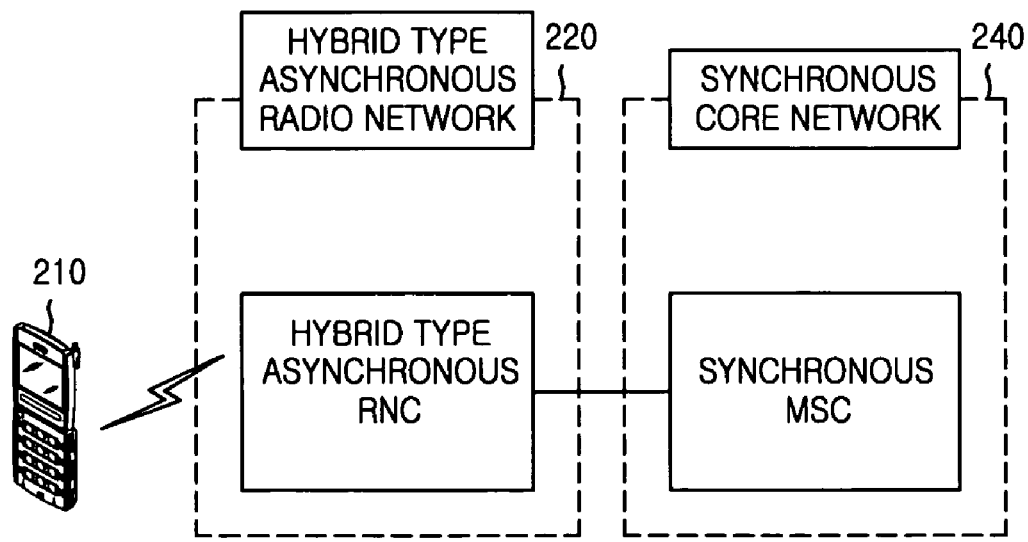
FIG. 3B is a view showing a synchronous ANSI-41 core network interface architecture of hybrid type asynchronous mobile station and radio network.
Figure 4B:
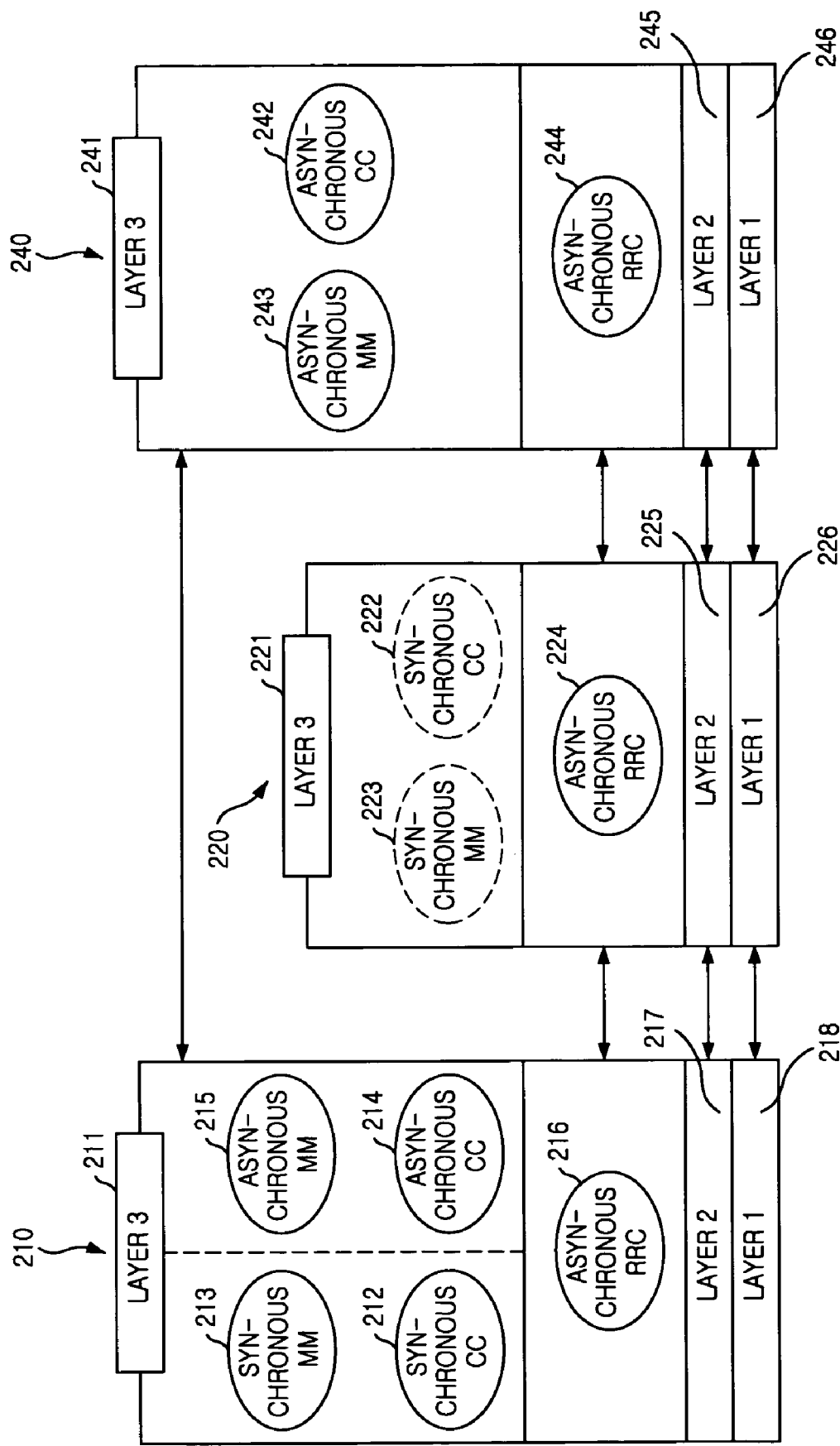
FIG. 4B is a view showing layered protocol structures of hybrid type asynchronous mobile station and radio network and the asynchronous GSM-MAP core network.
Figure 5A:
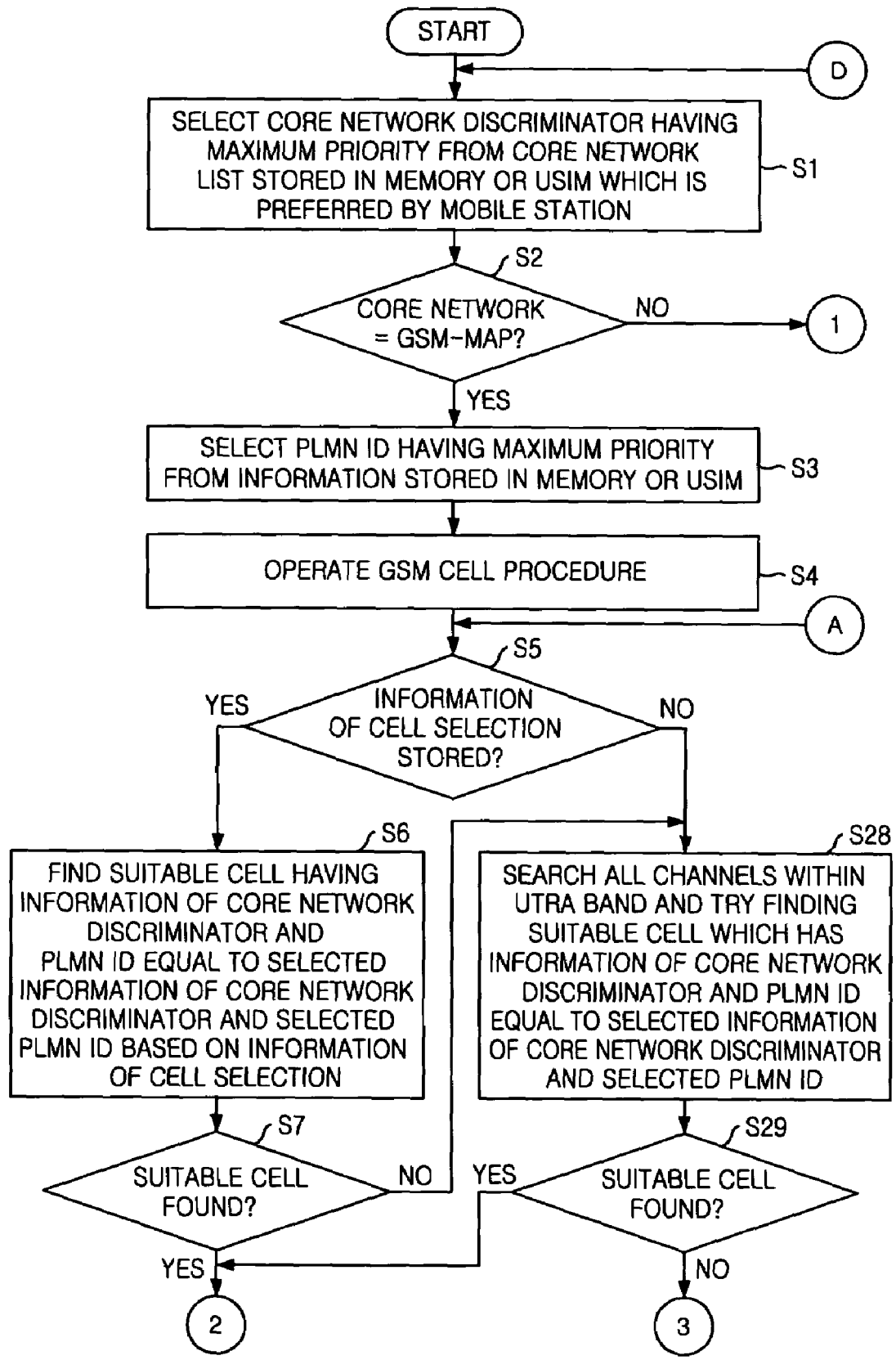
Figure 5B:
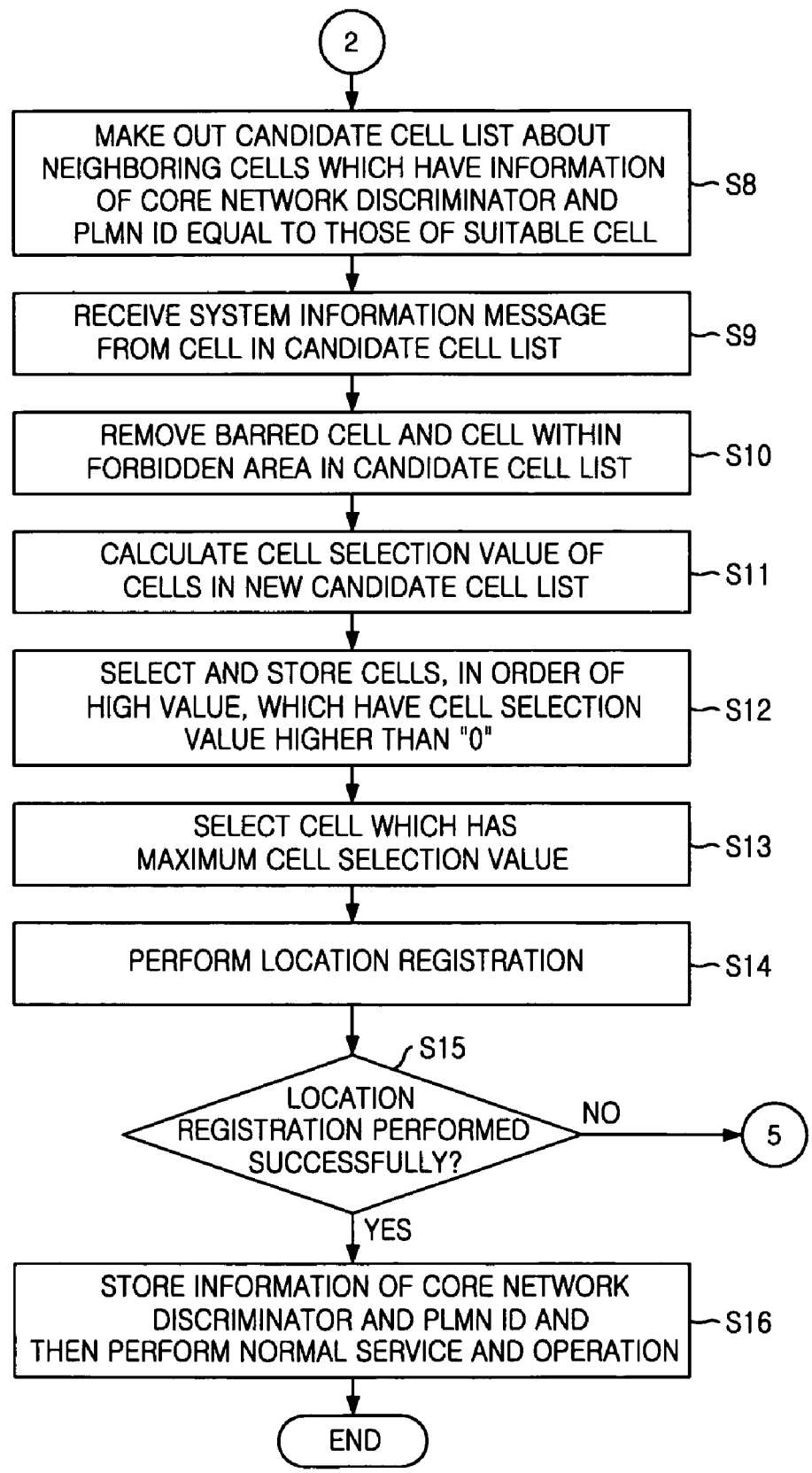
Figure 5D:
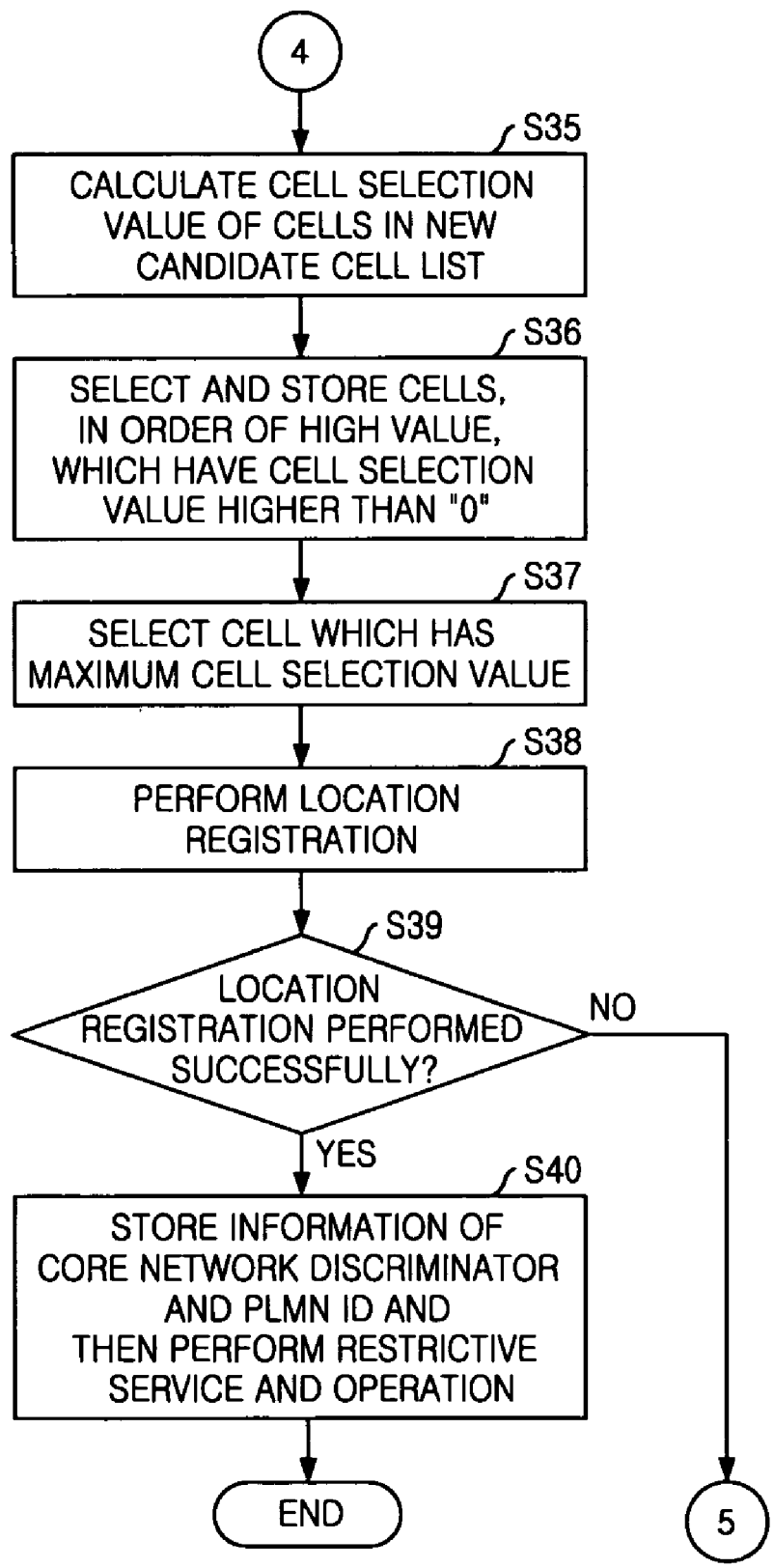
Figure 5E:
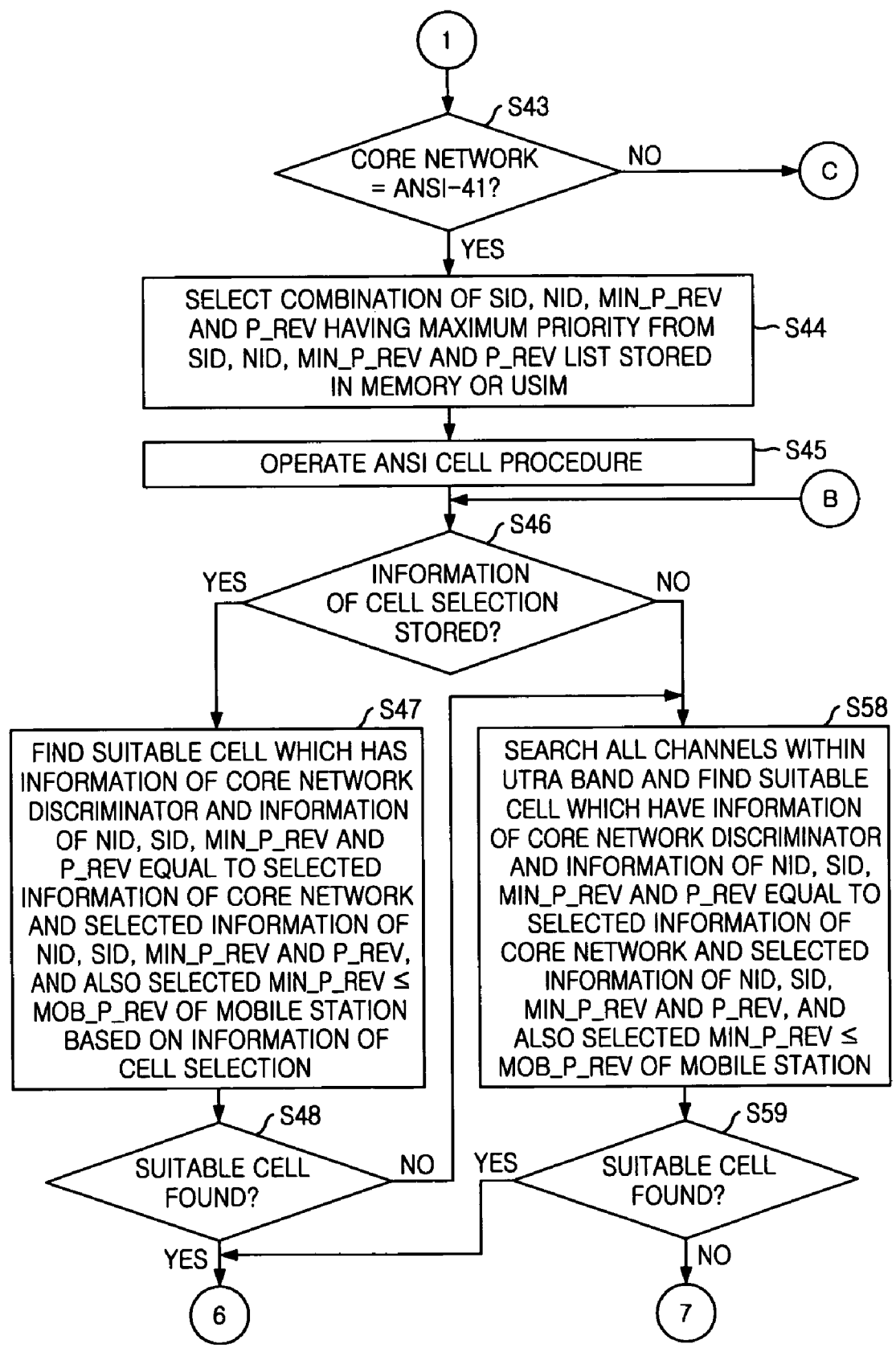
Figure 5G:
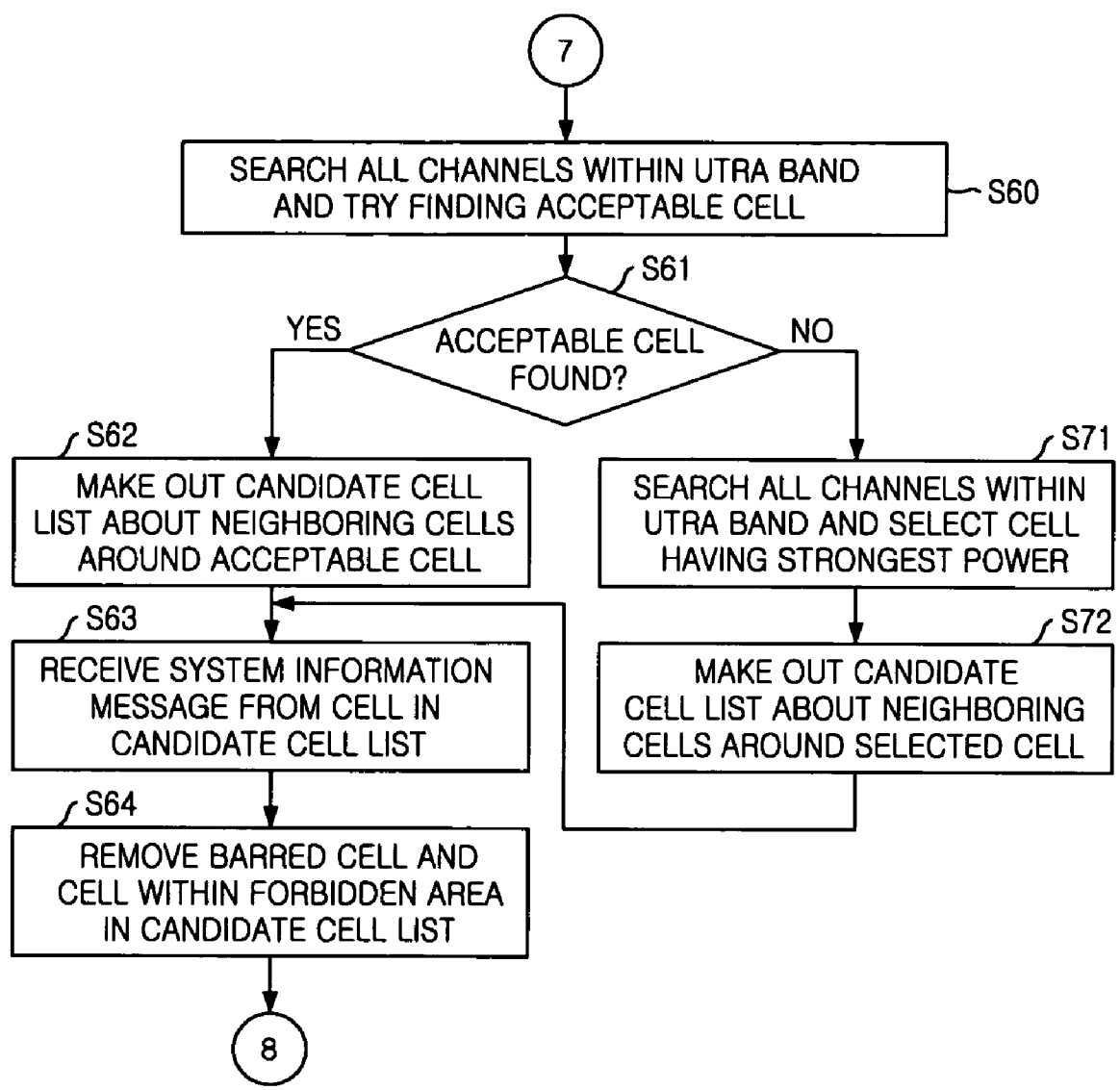
Figure 5H:
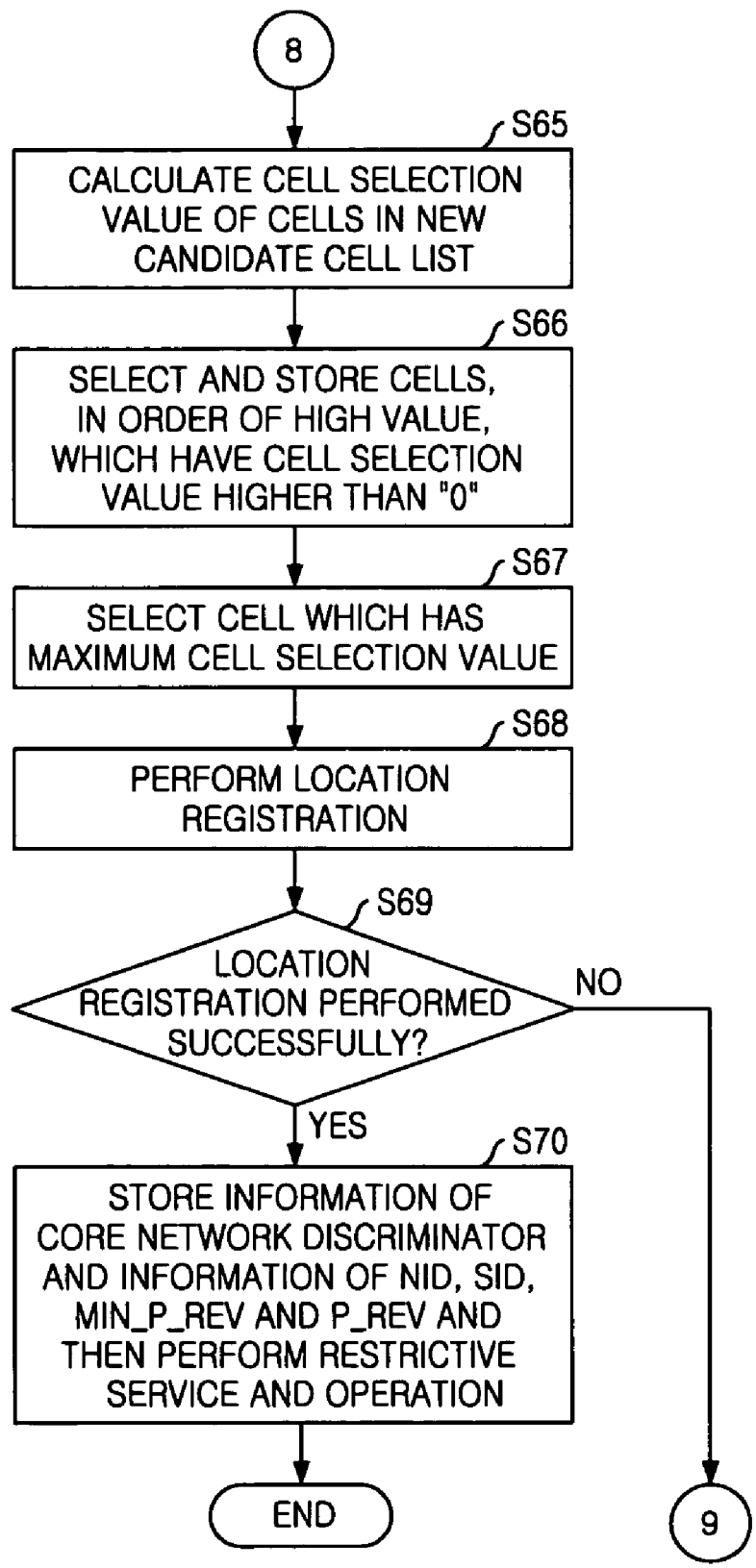
Figure 5I:
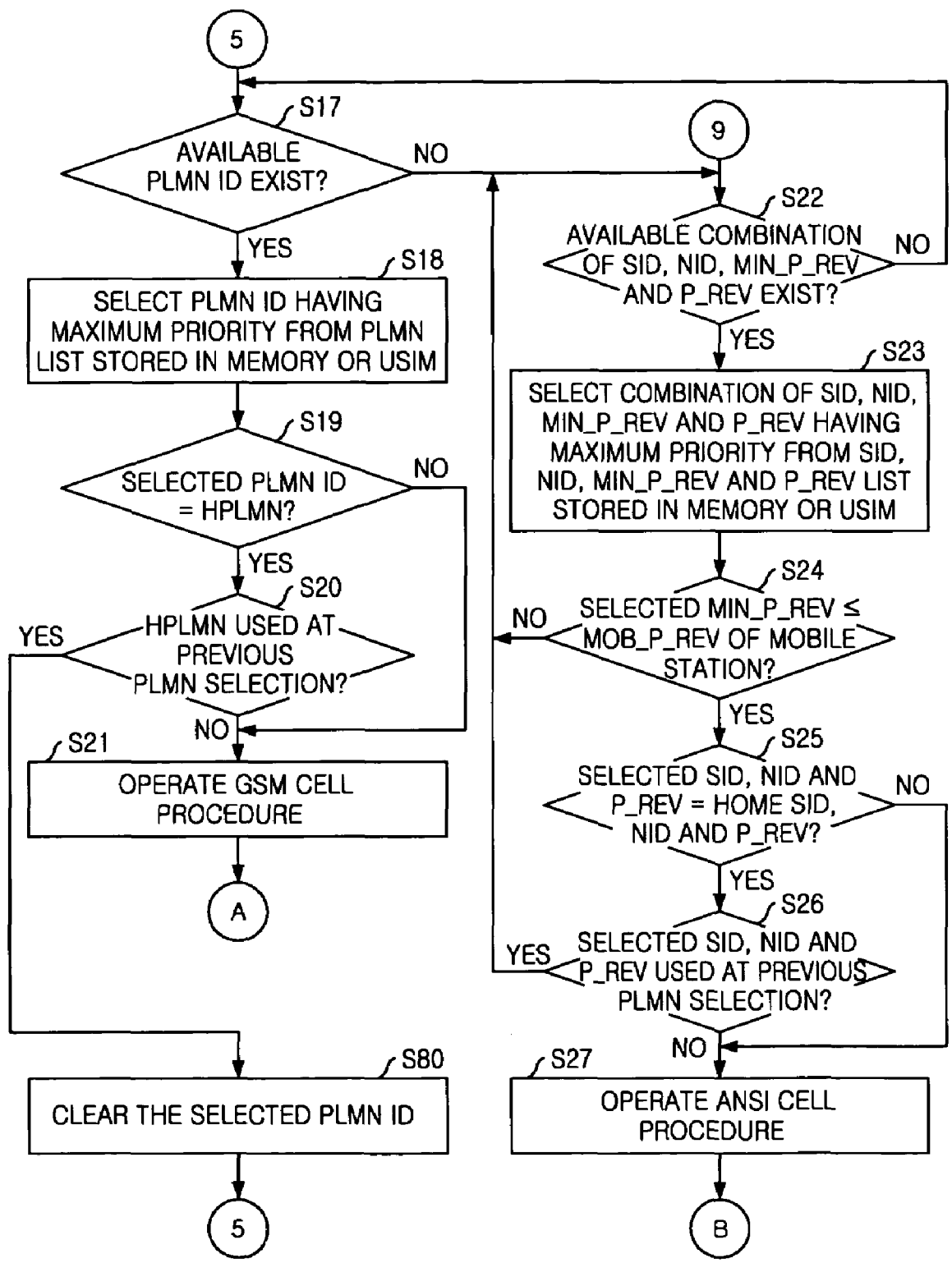
Figure 5J:
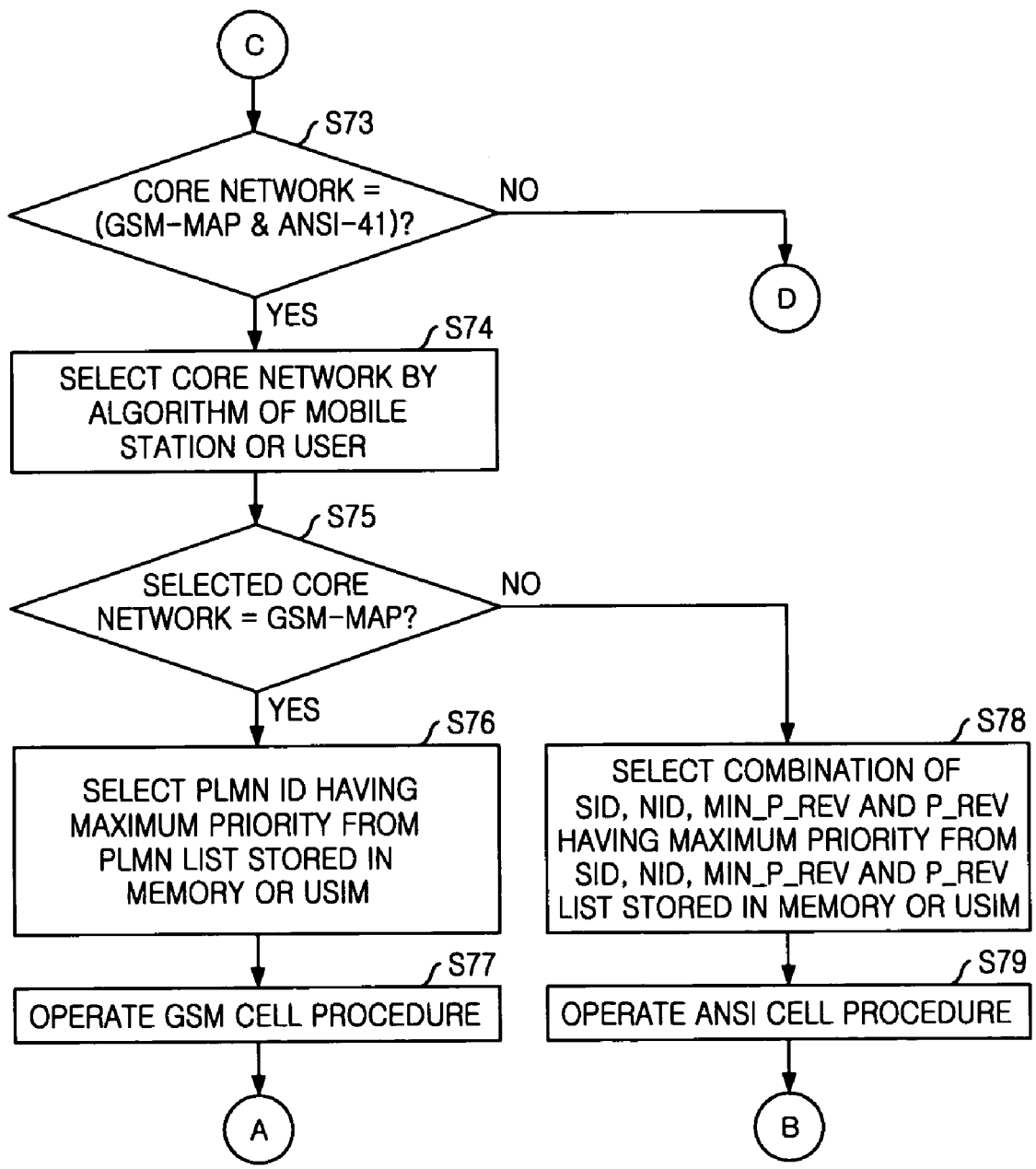

In case the asynchronous IMT-2000 system has an interlocking structure shown in FIG. 3B, the asynchronous mobile station, after power-on, should perform an extended PLMN selection and the cell selection. The extended PLMN selection means that the asynchronous mobile station uses the PLMN Identity information in case of the GSM-MAP core network and information of the NID and the SID in case of the ANSI-41 core network.

Thus, the asynchronous mobile station, prior to power-off, should store information described below, in order to perform the extended PLMN selection and the cell selection. Information to be stored is information of: a core network discriminator; a PLMN Identity including the MCC and the MNC in case the asynchronous radio network is interlocked with the GSM-MAP core network; and the SID and the NID in case the asynchronous radio network is interlocked with the ANSI-41 core network.

The above information of the core network discriminator refers to information that informs the type of the core network interlocked currently with the asynchronous mobile communication system. In the interlocking structure shown in FIG. 3A, an indicator meaning the GSM-MAP core network is included in the information of the core network discriminator, and in the interlocking structure shown in FIG. 3B, an indicator meaning the ANSI-41 core network is included in the core network discriminator. The information of the core network discriminator provides information of which core network should be selected in order to set up the PLMN and the cell, when the asynchronous mobile station performs the extended PLMN selection and the cell selection or the PLMN reselection and the cell reselection.

The PLMN ID for discriminating the PLMN of the GSM-MAP core network is the information of a network currently including the GSM-MAP core network. The PLMN Identity includes the MCC and the MNC.

Information of the SID and the NID for discriminating the ANSI-41 core network is the information of a network currently including the ANSI-41 core network. The SID is used for discriminating a plurality of networks and the NID is used for discriminating a plurality of systems.

The asynchronous mobile station, at power-on, performs the cell selection and the extended PLMN selection by using information of the cell selection stored in the memory or the USIM of the asynchronous mobile station or by searching powers of each RF channel within the UTRA band. When using the information of the cell selection, the asynchronous mobile station selects a cell having most possibility of being selected based on the information of the cell selection stored in the asynchronous mobile station. Also, the asynchronous mobile station selects a cell having the highest power after searching the RF channels in the UTRA band. And then, a candidate cell list that lists neighboring cells around the selected cell is made out.

The asynchronous mobile station receives a system information message from each cell listed in the candidate cell list and stores by cell, information of: a PLMN Identity or the SID and the NID according to the information of the core network discriminator; a registration region Identity; a cell priority; a minimum received level; a maximum UE transmit power; a type of cell; and information of a neighbor cell.

The asynchronous mobile station makes out a new candidate cell list except for the barred cell, the operator only cell, or cells included in the forbidden registration region from the candidate cell list having the above information. And the mobile station calculates cell selection values of each cell in the new candidate cell list. The asynchronous mobile station selects a cell, whose cell selection value is higher than "0" and the maximum, and receives a system information message from the selected cell.

After receiving the system information message, the asynchronous mobile station analyzes information of the core network discriminator of the system information message. As the result of analysis, in case the information of the core network discriminator indicates the asynchronous core network, the asynchronous mobile station stores the PLMN ID from the system information message, selects and fixes this as the PLMN. Also, in case the information of the core network discriminator indicates the synchronous core network, the asynchronous mobile station stores information of the NID and SID from the system information message, selects and fixes this as the PLMN. And then, the asynchronous mobile station performs the location registration to the system.

FIG. 5 shows how a cell selection and an extended PLMN selection of an asynchronous mobile station progress in an asynchronous IMT-2000 system.

First, an asynchronous mobile station is interlocked with an asynchronous radio network and an asynchronous GSM-MAP core network, and receives a system information message provided from the asynchronous radio network. The asynchronous mobile station selects out information of a core network discriminator, information of a PLMN ID according to the GSM-MAP core network, and information of an SID and an NID according to an ANSI-41 core network, from the received system information message.

Then, the asynchronous mobile station stores the above selected information in a memory and an USIM. At power-off of the asynchronous mobile station, the information of the core network discriminator, the information of the PLMN ID, and information of the cell are stored in the memory or the USIM.

At power-on, at step S1, the asynchronous mobile station selects information of a core network discriminator having a maximum priority from a core network list that the mobile station prefers. The core network list is stored in the memory or the USIM of the mobile station.

At step S2, the asynchronous mobile station determines a type of the core network, using the information of the core network discriminator. If the type of the core network is the GSM-MAP core network, at step S3, the asynchronous mobile station selects a PLMN Identity having the maximum priority from the information stored in the memory and the USIM, and if not, the logic flow proceeds to step S43.

At step S4, the asynchronous mobile station begins a GSM cell procedure.

After beginning the GSM cell procedure, at step S5, the asynchronous mobile station determines if information of the cell selection is stored. If the information of the cell selection is stored, the logic flow proceeds to step S6 and if the information of the cell selection is not stored, the logic flow proceeds to step S28.

If the information of the cell selection is stored, at step S6, the asynchronous mobile station searches a suitable cell having same information of the core network discriminator and a PLMN identity as the selected PLMN Identity and information of the core network discriminator, using the information of the cell selection.

At step S7, the asynchronous mobile station determines if the suitable cell satisfying the desired condition is searched. At this time, in case the suitable cell is searched, the logic flow proceeds to step S8. And, in case the suitable cell is not searched, the logic flow proceeds to step S28.

At step S8, the asynchronous mobile station makes out a cell list of neighboring cells having same information of the core network discriminator and the PLMN ID as those of the suitable cell around the suitable cell.

At step S9, the asynchronous mobile station receives the system information message from cells in the candidate cell list, and acquires information of the barred cell, information of the registration area, information of cell selection parameters, and information of the forbidden registration area from the system information message.

At step S10, the asynchronous mobile station makes out a new candidate cell list except for the barred cell and a cell within the forbidden registration area in the candidate cell list, referring to the received information.

At step S11, the cell selection values of the cells in the new cell list are calculated, using the mathematical equation (1).

At step S12, the asynchronous mobile station selects cells that the calculated cell selection values are higher than "0", and gives each selected cell corresponding priorities and then stores the cells with priority.

For example, supposing that 5 selected cells of cell 1, cell 2, cell 3, cell 4, and cell 5 have cell selection values of 1.2, 1.5, 0.3, 0.7, and 1.6, respectively, priorities of the cells to be stored in the memory are, priority 1=cell 5
priority 2=cell 2
priority 3=cell 1
priority 4=cell 4
priority 5=cell 3.

At step S13, the cell having the maximum priority out of the stored cells is selected. In case of the example, the cell has the maximum priority, and thus this cell is selected.

At step S14, the asynchronous mobile station performs the location registration of the selected cell.

At step S15, the asynchronous mobile station determines if the location registration is performed successfully, and if not, the logic flow proceeds to step S17, otherwise proceeds to step S16.

At step S16, the asynchronous mobile station stores information of the core network discriminator and the PLMN ID, and then performs a normal service and a call processing.

At step S17, the asynchronous mobile station determines if there is an available PLMN Identity, and if not, the logic flow proceeds to step S22, otherwise proceeds to step S18.

In case there is the new PLMN Identity, at step S18, the asynchronous mobile station selects a PLMN Identity having the maximum priority from the PLMN list stored in the memory or the USIM.

At step S19, the asynchronous mobile station determines if the selected PLMN Identity is the HPLMN, and if not, the logic flow proceeds to step S21, otherwise proceeds to step S20.

At the step S20, the asynchronous mobile station determines if the HPLMN was used for a previous cell selection, and if not, the logic flow proceeds to the step S21, otherwise proceeds to step S80.

At the step S21, the asynchronous mobile station operates the GSM cell procedure.

At step S22, the asynchronous mobile station determines if there is a combination of the SID, the NID, the MIN_P_REV, and P_REV available, and if not, after clearing the selected PLMN ID, the logic flow returns to the step S17, otherwise the logic flow proceeds to step S23.

At the step S23, the asynchronous mobile station selects a combination of the SID, the NID, the MIN_P_REV, and the P_REV having a maximum priority out of the SID, the NID, the MIN_P_REV, and the P_REV list stored in the memory or the USIM.

At step S24, the asynchronous mobile station determines if the selected MIN_P_REV is equal to or lower than a MOB_P_REV of the asynchronous mobile station, and if not, the logic flow returns to the step S22, otherwise the logic flow proceeds to step S25 where the asynchronous mobile station determines if the selected SID, NID, and P_REV is equal to a HOME SID, NID, and P_REV.

At step S25, the mobile station determines if the selected SID, NID, and P_REV are equal to HOME SID, NID, and P_REV, and if not, the logic flow proceeds to step S27, otherwise proceeds to step S26.

At step S26, the asynchronous mobile station determines if the selected combination of the SID, the NID and the P_REV was used for the prior PLMN selection, and if not, the logic flow proceeds to step S27 where the asynchronous mobile station operates the ANSI cell procedure, otherwise the logic flow returns to the step S22.

If the information of the cell selection is not stored in the mobile station, at the step S5, or if the mobile station fails to find a suitable cell, at the step S7, the logic flow proceeds to step S28.

At the step S28, the asynchronous mobile station searches all RF channels within the UTRA band and to thereby try finding out a cell which has information of the core network discriminator and a PLMN ID equal to the selected information of the core network discriminator and the selected PLMN ID, that is to say, a suitable cell that are selected.

At step S29, the mobile station determines if the suitable cell is found out, and if not, the logic flow proceeds to step S30 where the mobile station searches all channels within the UTRA band and to thereby try finding out an acceptable cell, otherwise the logic flow returns to the step S8.

At step S31, the mobile station determines if the acceptable cell is found out, and if not, the logic flow proceeds to step S41, otherwise the logic flow proceeds to step S32 where the mobile station makes out a candidate cell list about neighboring cells around the searched acceptable cell.

At step S33, the mobile station receives a system information message from the cells in the candidate cell list and acquires information of a barred cell, information of a registration area, information of cell selection parameters, and information of a forbidden registration area from the system information message.

At step S34, the mobile station makes out a new candidate cell list wherein the barred cell and a cell within the forbidden registration area are removed from the candidate cell list, based on the information acquired at the step S33.

At step S35, cell selection values of each cell in the new candidate cell list are calculated, based on a mathematical equation (1), S=Q−Qm−Pc.

In the mathematical equation (1), S, Q, $Q_m$, and $P_c$ denotes a cell selection value having a unit of dB, a quality value of a received signal having a unit of dB, a quality value minimally required in the cell having a unit of dB, and a compensation value having a unit of dB, respectively.

At step S36, cells the cell selection value of which is higher than "0" are selected and stored in order of high value in the mobile station. At step S37, a cell of a maximum cell selection value is selected. At step S38, a location registration to the cell selected at the step S37 is performed.

At step S39, the mobile station determines if the location registration is performed successfully, and if not, the logic flow returns to the step S17, otherwise proceeds to step S40 where the information of the core network discriminator and the PLMN ID are stored in the mobile station, and then a restrictive service such as an emergency call service and an operation corresponding to the service are performed.

At step S41, the mobile station searches all RF channels within the UTRA band and selects a cell a power of which is maximum. At step S42, the mobile station makes out a candidate cell list about neighboring cells around the cell selected at the step S41, and then the logic flow returns to the step S33.

At step S43, the mobile station determines if the type of the core network is the ANSI-41 core network, and if not, the logic flow proceeds to step S73, otherwise proceeds to step S44 where the mobile station selects a combination of the SID, the NID, the MIN_P_REV, and the P_REV having a maximum priority from the SID, the NID, the MIN_P_REV, and the P_REV list stored in the memory or the USIM.

At step S45, the asynchronous mobile station begins an ANSI cell procedure.

After beginning the ANSI cell procedure, at step S46, the mobile station determines if information of the cell selection about the combination of the NID, the SID, the MIN_P_REV, and the P_REV, is stored in it, and if not, the logic flow proceeds to step S58, otherwise proceeds to step S47 where the mobile station try finding out a suitable cell wherein information of the core network discriminator and information of the NID, the SID, the MIN_P_REV, and the P_REV are equal to the selected information of the core network discriminator and the selected information of the NID, the SID, the MIN_P_REV, and the P_REV, respectively, and the selected MIN_P_REV is equal to or lower than a MOB_P_REV of the mobile station.

At step S48, the mobile station determines if the suitable cell is found out, and if not, the logic flow proceeds to step S58 where the mobile station searches all RF channels within the UTRA band and then finds out a suitable cell wherein information of the core network discriminator and information of the NID, the SID, the MIN_P_REV, and the P_REV are equal to the selected information of the core network discriminator and the selected information of the NID, the SID, the MIN_P_REV, and the P_REV, and the selected MIN_P REV is equal to or lower than the MOB_P_REV of the mobile station, otherwise the logic flow proceeds to step S49 where the mobile station makes out a candidate cell list about cells from neighboring cells around the searched suitable cell, wherein information of the core network discriminator and information of the NID, the SID, the MIN_P_REV, and the P_REV are equal to the selected information of the core network discriminator and the selected information of the NID, the SID, the MIN_P_REV, and the P_REV, and the selected MIN_P_REV is equal to or lower than the MOB_P_REV of the mobile station.

At step S50, the mobile station receives a system information message from the cells in the candidate cell list made out at the step S49 and acquires information of the barred cell, information of the registration area, information of the cell selection parameters, and information of the forbidden registration area from the received system information message.

At step S51, the mobile station makes out a new candidate cell list wherein the barred cell and a cell within the forbidden registration area are removed from the candidate cell list, based on the information acquired at the step S50.

At step S52, cell selection values of each cell in the new candidate cell list are calculated, based on a mathematical equation (1), S Q−Qm−Pc.

In the mathematical equation (1), S, Q, $Q_m$, and $P_c$ denotes a cell selection value having a unit of dB, a quality value of a received signal having a unit of dB, a quality value minimally required in the cell having a unit of dB, and a compensation value having a unit of dB, respectively.

At step S53, cells the cell selection value of which is higher than "0" are selected and stored in order of high value in the mobile station. At step S54, a cell of a maximum cell selection value is selected. At step S55, a location registration to the cell selected at the step S54 is performed.

At step S56, the mobile station determines if the location registration is performed successfully, and if not, the logic flow returns to the step S22, otherwise proceeds to step S57 where the information of the core network discriminator and the PLMN ID are stored in the mobile station, and then a normal service and an operation for a call process are performed.

At step S58, the mobile station tries searching all channels within the UTRA band and then tries finding out a suitable cell wherein information of the core network discriminator and information of the NID, the SID, the MIN_P_REV, and the P_REV are equal to the selected information of the core network discriminator and the selected information of the NID, the SID, the MIN_P_REV, and the P_REV, respectively, and the selected MIN_P_REV is equal to or lower than a MOB_P_REV of the mobile station.

At step S59, the mobile station determines if the suitable cell is found out successfully, and if not, the logic flow returns to step S60 where the mobile station searches all channels within the UTRA band and to thereby try finding out an acceptable cell, otherwise the logic flow returns to the step S49.

At step S61, the mobile station determines if the acceptable cell is found out, and if not, the logic flow proceeds to step S71, otherwise the logic flow proceeds to step S62 where the mobile station makes out a candidate cell list about neighboring cells around the searched acceptable cell.

At step S63, the mobile station receives a system information message from the cells in the candidate cell list and acquires information of a barred cell, information of a registration area, information of cell selection parameters, and information of a forbidden registration area from the system information message.

At step S64, the mobile station makes out a new candidate cell list wherein the barred cell and a cell within the forbidden registration area are removed from the candidate cell list, based on the information acquired at the step S63.

At step S65, cell selection values of each cell in the new candidate cell list are calculated, based on a mathematical equation (1), S=Q−Qm−Pc.

In the mathematical equation (1), S, Q, $Q_m$, and $P_c$ denotes a cell selection value having a unit of dB, a quality value of a received signal having a unit of dB, a quality value minimally required in the cell having a unit of dB, and a compensation value having a unit of dB, respectively.

At step S66, cells the cell selection value of which is higher than "0" are selected and stored in order of high value in the mobile station. At step S67, a cell of a maximum cell selection value is selected.

At step S68, a location registration to the cell selected at the step S67 is performed.

At step S69, the mobile station determines if the location registration is performed successfully, and if not, the logic flow returns to the step S22, otherwise proceeds to step S70 where the information of the core network discriminator and the PLMN ID are stored in the mobile station, and then a restrictive service such as an emergency call service and an operation corresponding to the service are performed.

At step S71, the mobile station searches all RF channels within the UTRA band and selects a cell whose power is maximum.

At step S72, the mobile station makes out a candidate cell list about neighboring cells around the cell selected at the step S71, and then the logic flow returns to the step S63.

At step S73, the mobile station determines if both the GSM-MAP core network and the ANSI-41 core network are interlocked together, and if not, the logic flow returns to the step S1, otherwise proceeds to step S74 where one core network of both the GSM-MAP core network and the ANSI-41 core network is selected by an algorithm stored in the mobile station or a user.

At step S75, the mobile station determines if the selected core network is the GSM-MAP core network, and if not, the logic flow proceeds to step S78, otherwise proceeds to step S76.

At the step S76, the mobile station selects a PLMN ID having a maximum priority from the PLMN list stored in the memory or the USIM.

At step S77, the GSM cell procedure, that is to say, an operation mode of a GSM cell selection is performed and then the logic flow returns to the step S5.

At the step S78, the mobile station selects a combination of the SID, the NID, the MIN_P_REV, and the P_REV having a maximum priority in the memory or the USIM.

At step S79, an ANSI cell procedure, that is, an operation mode of an ANSI cell selection is performed and then the logic flow returns to the step S46.

As can be seen from the present invention described above, since the mobile station can perform a PLMN selection and a cell selection regardless of a type of an interlocked core network, the asynchronous mobile station can perform good data interfaces with whichever core network is interlocked with it. Thus, a subscriber in the asynchronous mobile communication system can use a service provided from the synchronous ANSI-41 core network.

Although the preferred embodiments of the invention have been disclosed for illustrative purpose, those skilled in the art will appreciate that various modifications, additions, and substitutions are possible, without departing from the scope and sprit of the invention as disclosed in the accompanying claims.

What is claimed is:

1. A method for cell selection of an asynchronous mobile station in an asynchronous mobile communication system including the asynchronous mobile station and an asynchronous radio network, wherein the asynchronous radio network is interlocked with a core network, the method comprising the steps of:
   a) storing information related to the core network transmitted from the asynchronous radio network in a memory or a user subscriber identity module (USIM) of the asynchronous mobile station before power-off of the asynchronous mobile station;
   b) at power-on of the asynchronous mobile station, determining what type of the core network is interlocked by analyzing information of a core network discriminator;
   c) beginning any one of a global system for mobile communication (GSM) cell procedure and an American national standards institute (ANSI) cell procedure;
   d) finding a cell suitable for providing a service, based on a type of the core network that was determined; and, performing a location registration of the mobile station according to the found cell in order to provide a service, wherein the step b) includes the steps of:
   b1) selecting the information of the core network discriminator having a maximum priority from a core network list which is stored in the USIM or the memory and is probable to be referred by the asynchronous mobile station;
   b2) determining whether the information of the core network discriminator indicates an asynchronous core network or a synchronous core network;
   b3) if the information of the core network discriminator indicates the asynchronous core network, selecting the PLMN ID having a maximum priority from the information related to the asynchronous core network; and
   b4) if the information of the core network discriminator indicates the synchronous core network, selecting a combination of a system identity (SID), a network identity (NID), a protocol revision (P_REV) and a minimum protocol revision (MIN_P_REV) having a maximum priority from the information related to the synchronous core network.

2. The method as recited in claim 1, wherein the step d) includes the steps of:
   d1) when beginning the GSM cell procedure, finding a suitable cell wherein the asynchronous mobile station can perform a normal service by determining if information of a cell selection is stored in the memory or the USIM;

d2) if failing to find the suitable cell, finding an acceptable cell wherein the asynchronous mobile station can not perform the normal service but an emergency call; and d3) if failing to find the acceptable cell, finding a cell having a maximum power.

3. The method as recited in claim 2, wherein the step d1) includes the steps of:

d11) if the information of the cell selection is stored in the memory or the USIM, finding a suitable cell that has information of the core network discriminator and a PLMN ID equal to the selected information of the core network discriminator and the selected PLMN ID based on the information of the cell selection;

d12) if the information of the cell selection is not stored in the memory or the USIM, finding a suitable cell that has information of the core network discriminator and the PLMN ID equal to the selected information of the core network discriminator and the selected PLMN ID by searching all channels within a universal mobile telecommunication system terrestrial radio access (UTRA) band.

4. The method as recited in claim 3, wherein the step d11) includes the steps of:

d111) if failing to find the suitable cell that has information of the core network discriminator and the PLMN ID equal to the selected information of the core network discriminator and the selected PLMN ID based on the information of the cell selection, finding a suitable cell that has information of the core network discriminator and the PLMN ID equal to the selected information of the core network discriminator and the selected PLMN ID by searching all channels within a universal mobile telecommunication system terrestrial radio access (UTRA) band.

5. The method as recited in claim 4, wherein the step d12) includes the steps of:

d21) if tailing to find the suitable cell at the steps d11) or d12), find the acceptable cell by searching all channels within a universal mobile telecommunication system terrestrial radio access (UTRA) band.

6. The method as recited in claim 5, wherein the step d3) includes the steps of:

d31) if failing to find the acceptable cell at the step d21), finding the cell having the maximum power by searching all channels within a universal mobile telecommunication system terrestrial radio access (UTRA) band.

7. The method as recited in claim 6, wherein the step e) includes the step steps of:

e1) when finding the suitable cell at the step d21), making out a candidate cell list that contains information about neighboring cells around the found suitable cell;

e2) making out a new candidate cell list that contains the information about the other cells except for some cells among the neighboring cells listed in the candidate cell list;

e3) performing the location registration of a cell having a maximum cell selection value; and e4) determining if the location registration is performed successfully.

8. The method as recited in claim 7, wherein the information about the neighboring cells which have information of the core network discriminator and the PLMN ID equal to those about the found suitable cell, are contained in the candidate cell list.

9. The method as recited in claim 7, wherein the step e2) includes the steps of:

e21) receiving a system information message from the neighboring cells listed in the candidate cell list; and e22) removing some cells which include a barred cell or a cell within a forbidden registration area from the candidate cell list.

10. The method as recited in claim 9, wherein the step e3) includes the steps of:

e31) calculating the cell selection values of each cell listed in the new candidate cell list;

e32) selecting cells each cell selection value of which is higher than zero, thereby storing the selected cell selection values in order of a high value in the memory or the USIM;

e33) selecting a cell having a maximum cell selection value from the stored cell selection values; and e34) performing the location registration of the mobile station according to the selected cell.

11. The method as recited in claim 10, wherein the step e4) includes the steps of:

e41) if succeeding in the location registration, storing the selected information of the core network discriminator and the selected PLMN ID in the memory or the USIM; and e42) performing a normal service and a call processing.

12. The method as recited in claim 11, wherein the step e4) further includes the steps of:

e43) if failing in the location registration, determining if new usable PLMN ID exists;

e44) if the new usable PLMN ID exists, selecting a PLMN ID having a maximum priority from a PLMN list stored in the memory or USIM;

e45) determining if the selected PLMN ID indicates a home public land mobile network (HPLMN);

e46) if the selected PLMN ID indicates the HPLMN, determining if the selected PLMN ID was used for a previous PLMN selection; and e47) if the selected PLMN ID was not used for the previous PLMN selection, going the step d1).

13. The method as recited in claim 12, wherein the step e4) further includes the step of:

e48) if the selected PLMN ID doesn't indicate the HPLMN, going to the step d1).

14. The method as recited in claim 13, wherein the step e4) further includes the step of:

e49) if the selected PLMN ID was used for the previous PLMN selection, clearing the selected PLMN ID from the memory or the USIM and then going to the step e43) and determining if new usable PLMN ID exists.

15. The method as recited in claim 14, wherein the step d12) includes the steps of:

d121) if succeeding in finding the suitable cell, going to the step e); and d122) if failing to find the suitable cell, going to the step d2).

16. The method as recited in claim 15, wherein the step d2) includes the steps of:

d22) finding the acceptable cell by searching all channels within a universal mobile telecommunication system terrestrial radio access (UTRA) band; and d23) determining if the acceptable cell is found.

17. The method as recited in claim 16, wherein the step e) includes the steps of:

ea1) making out a candidate cell list that contains information about neighboring cells around the found acceptable cell;

ea2) making out a new candidate cell list that contains information about the other cells except for some cells among the neighboring cells listed in the candidate cell list;

ea3) performing the location registration of a cell having a maximum cell selection value; and ea4) determining if the location registration is performed successfully.

18. The method as recited in claim 17, wherein the information about the neighboring cells which have information of the core network discriminator and the PLMN ID equal to those about the found acceptable cell, are contained in the candidate cell list.

19. The method as recited in claim 18, wherein the step ea2) includes the steps of ea21) at the mobile station, receiving a system information message from the neighboring cells listed in the candidate cell list; and ea22) removing some cells which include a barred cell or a cell within a forbidden registration area from the candidate cell list.

20. The method as recited in claim 19, wherein the step ea3) includes the steps of:

ea31) calculating the cell selection values of each cell listed in the new candidate cell list;

ea32) selecting cells each cell selection value of which is higher than zero, thereby storing the selected cell selection values in order of a high value in the memory or the USIM;

ea33) selecting a cell having a maximum cell selection value from the stored cell selection values; and ea34) performing the location registration of the selected cell.

21. The method as recited in claim 20, wherein the step ea4) includes the steps of: ea41) if succeeding in the location registration, storing the selected information of the core network discriminator and the selected PLMN ID in the memory or the USIM; and ea42) performing a restrictive service and restrictive operations.

22. The method as recited in claim 21, wherein the step ea4) further includes the step of:

ea43) if failing to perform the location registration, going to the step e43) and determining if new usable PLMN ID exists.

23. The method as recited in claim 22, wherein the step d3) includes the steps of:

d31) searching all channels within the UTRA band; d32) selecting a cell having a maximum power;

d33) making out a candidate cell list that contains information about neighboring cells around the selected cell; and d34) going to the step ea2).

24. The method as recited in claim 23, wherein the information about the neighboring cells which have information of the core network discriminator and the PLMN ID equal to those about the selected cell, are contained in the candidate cell list.

25. The method as recited in claim 16, wherein the step d23) includes the steps of:

d231) if finding the acceptable cell, going to the step ea1); and d232) if failing to finding the acceptable cell, going to the step d31).

26. The method as recited in claim 16, wherein the step d) further includes the steps of:

d4) when beginning the ANSI cell procedure, finding a suitable cell wherein the asynchronous mobile station can perform a normal service by determining if information of cell selection is stored in the memory or the USIM;

d5) if failing to find the suitable cell, finding an acceptable cell wherein the asynchronous mobile station can not perform the normal service but an emergency call;

and d6) if failing to find the acceptable cell, finding a cell having a maximum power.

27. The method as recited in claim 26, wherein the step d4) includes the steps of:

d41) if the information of the cell selection is stored in the memory or the USIM, finding a suitable cell that has information of the core network discriminator and the SID, the NID, the MIN_P_REV and the P_REV equal to the selected information of the core network discriminator and the selected SID, NID, MIN_P_REV and P_REV based on the information of the cell selection;

d42) if the information of the cell selection is not stored in the memory of the USIM, finding a suitable cell that has information of the core network discriminator and the SID, the NID, the MIN_P_REV and the P_REV equal to the selected information of the core network discriminator and the selected SID, NID, MIN_P_REV and P_REV by searching all channels within a universal mobile telecommunication system terrestrial radio access (UTRA) hand.

28. The method as recited in claim 27, wherein the step d41) includes the steps of d411) of failing to the suitable cell that has the information of the core network discriminator and the SID, the NID, the MIN_P_REV and the P-REV equal to the selected information of the core network discriminator and the selected SID, NID, MIN_P_REV and P_REV based on the information of the cell selection, finding a suitable cell that has information of the core network discriminator and the SID, the NID, the MIN_P_REV and the P_REV equal to the selected information of the core network discriminator and the selected SID, NID, MIN_P_REV and P_REV, by searching all channels within a universal mobile telecommunication system terrestrial radio access (UTRA) band.

29. The method as recited in claim 28, wherein the step d5) includes the steps of:

d51) if failing to find the suitable cell at the steps d411) or d42), finding the acceptable cell by searching all channels within a universal mobile telecommunication system terrestrial radio access (UTRA) band.

30. The method as recited in claim 29, wherein the step d6) includes the steps of:

d61) if failing to find the acceptable cell at the step d6) includes the step of d51), finding a cell having a maximum power by searching all channels within a universal mobile telecommunication system terrestrial radio access (UTRA) band.

31. The method as recited in claim 30, wherein the step e) further includes the step of:

e5) when finding the suitable cell at the step d51), making out a candidate cell list that contains information about neighboring cells around the found suitable cell;

e6) making out a new candidate cell list that contains information about the other cells except for some cells among the neighboring cells listed in the candidate cell list;

e7) performing the location registration of a cell having a maximum cell selection value; and e8) determining if the location registration is performed successfully.

32. The method as recited in claim 31, wherein the information about the neighboring cells which have information of the core network discriminator and the SID, the NID, the MIN_P_REV and the P_REV equal to those about the found suitable cell, are contained in the candidate cell list.

33. The method as recited in claim 31, wherein the step e6) includes the steps of:
    e61) receiving a system information message from the neighboring cells listed in the candidate cell list; and
    e62) removing some cells which include a barred cell or a cell within a forbidden registration area from the candidate cell list.

34. The method as recited in claim 33, wherein the step e7) includes the steps of:
    e71) calculating the cell selection values of each cell listed in the new candidate cell list;
    e72) selecting cells each cell selection value of which is higher than zero, thereby storing the selected cell selection values in order of a high value in the memory or the USIM;
    e73) selecting a cell having a maximum cell selection value from the stored cell selection values; and
    e74) performing the location registration of the selected cell.

35. The method as recited in claim 34, wherein the step e8) includes the steps of:
    e81) if succeeding in the location registration, storing the selected information of the core network discriminator and the selected SID, NID, MIN_P_REV and P_REV in the memory or the USIM: and
    e82) performing a normal service and a call processing.

36. The method as recited in claim 35, wherein the step e8) further includes the steps of:
    e83) if failing to perform the location registration, determining if new usable combination of the SID, the NID, the MIN_P_REV and the P_REV exists;
    e84) if the new usable combination of the SID, the NID, the MIN_P_REV and the P_REV exists, selecting a combination of SID, the NID, the MIN_P_REV and the P_REV having a maximum priority from the SID, the NID, the MIN_P_REV and the P_REV list stored in the memory or USIM, and otherwise, going to step e43);
    e85) determining if the selected MIN_P_REV is equal to or lower than a mobile protocol revision (MOB_P_REV) of the asynchronous mobile station;
    e86) if the selected MIN_P_REV is equal to or lower than the MOB_P_REV of the synchronous mobile station, determining if the selected SID, NID and P_REV are equal to HOME SID, NID, and P_REV;
    e87) if the selected SID, NID and P_REV are equal to the HOME SID, NID and P_REV, determining it the selected combination of SID, the NID, the MIN_P_REV and the P_REV was used for a previous PLMN selection;
    e88) if the selected combination of the SID, the NID, the MIN_P_REV and the P_REV was not used for the previous PLMN selection, going to step d4).

37. The method as recited in claim 36, wherein the step e8) further includes the step of:
    e89) if the selected MIN_P_REV is not equal to or lower than the MOB_P_REV of the asynchronous mobile station, going to the step d4).

38. The method as re cited in claim 37, wherein the step e8) further includes the step of:
    e90) if the selected SID; NID and P_REV are not equal to the HOM SID, NID and P_REV, going to the step d4).

39. The method as recited in claim 38, wherein the step e8) further includes the step of:
    e91) if the selected combination of SID, the NID, the MIN_P_REV and the P_REV was used for the previous PLMN selection, clearing the selected combination of the SID, the NID, the MIN_P_REV and the P_REV from the memory or the USIM and then going to the step e83).

40. The method as recited in claims 39, wherein the step d42) includes the steps of:
    d421) if succeeding in finding the suitable cell, going to the step e); and d422) if failing to find the suitable cell, going to the step d5).

41. The method as recited in claim 40, wherein the step d5) includes the steps of:
    d51) finding the acceptable cell by searching all channels within a universal mobile telecommunication system terrestrial radio access (UTRA) band; and
    d52) determining if the acceptable cell is found.

42. The method as recited in claim 41, wherein the step e) further includes the steps of:
    ea5) making out a candidate cell list that contains information about neighboring cells around the found acceptable cell;
    ea6) making out a new candidate cell list that contains information about the other cells except for some cells among the neighboring cells listed in the candidate cell list;
    ea7) performing the location registration of a cell having a maximum cell selection value; and
    ea8) determining if the location registration is performed successfully.

43. The method as recited in claim 42, wherein the information about the neighboring cells which have information of the core network discriminator and the SID, the NID, the MIN_P_REV and the P_REV equal to those about the found acceptable cell, re contained in the candidate cell list.

44. The method as recited in claim 43, wherein the step ea6) includes the steps of:
    ea621) receiving a system information message from the neighboring cells listed in the candidate cell list; and
    ea62) removing sonic cells which include a barred cell or a cell within a forbidden registration area from the candidate cell list.

45. The method as recited in claim 44, wherein the step ea7) includes the steps of:
    ea71) calculating the cell selection values of cells listed in the new candidate cell list;
    ea72) selecting cells each cell selection value of which is higher than zero, thereby storing the selected cell selection values in order of a high value in the memory or the USIM;
    ea73) selecting a cell having a maximum cell selection value from the stored cell selection values; and
    ea74) performing the location registration of the selected cell.

46. The method as recited in claim 45, wherein the step ea8) includes the steps of:
- ea81) if succeeding in the location registration, storing the selected information of the core network discriminator and the selected SID, the NID, the MIN_P_REV and the P_REV in the memory or the USIM; and
- ea82) performing a restrictive service and restrictive operations.

47. The method as recited in claim 46, wherein the step ea8) further includes the step of:
- ea83) if failing to perform the location registration, going to step e83) and determining if new usable combination of the SID, the NID, the MIN_P_REV and the P_REV exists.

48. The method as recited in claim 47, wherein the step d6) includes the steps of:
- d61) searching all channels within the UTRA band; d62) selecting a cell having a maximum power;
- d63) making out a candidate cell list that contains information about neighboring cells around the selected cell; and
- d64) going to the step ea6).

49. The method as recited in claim 48, wherein the information about the neighboring cells which have information of the core network discriminator and the SID, the NID, the MIN_P_REV and the P_REV equal to those about the selected cell, are contained in the candidate cell list.

50. The method as recited in claim 41, wherein the step d52) includes the steps of:
- d521) if find the acceptable cell, going to the step ea5); and
- d522) if failing to find the acceptable cell, going to the step d61).

51. The method as recited in claim 1, wherein the step b) further includes the step of:
- b5) if the information of the core network discriminator indicates an asynchronous core network and a synchronous core network, selecting one of the asynchronous core network and the synchronous core network according to the information of the core network discriminator.

52. The method as recited in claim 51, wherein one of the asynchronous core network and the synchronous core network is selected based on a selection algorithm stored in the asynchronous mobile station.

53. The method as recited in claim 51, wherein the step b5) includes the steps of:
- b51) determining if the selected core network is the GSM-MAP core network;
- b52) if the selected core network is the GSM-MAP core network, going to the step b3); and
- b53) if the selected core network is the ANSI-41 core network, going to the step b4).

* * * * *